United States Patent
Echizen et al.

(10) Patent No.: US 12,166,380 B2
(45) Date of Patent: Dec. 10, 2024

(54) MOTOR

(71) Applicant: DENSO CORPORATION, Kariya (JP)

(72) Inventors: Masayuki Echizen, Kariya (JP); Seigo Shinoda, Kariya (JP); Naoto Natsume, Kariya (JP)

(73) Assignee: DENSO CORPORATION, Kariya (JP)

( * ) Notice: Subject to any disclaimer, the term of this patent is extended or adjusted under 35 U.S.C. 154(b) by 430 days.

(21) Appl. No.: 17/562,744

(22) Filed: Dec. 27, 2021

(65) Prior Publication Data

US 2022/0123608 A1 Apr. 21, 2022

Related U.S. Application Data

(63) Continuation of application No. PCT/JP2020/024191, filed on Jun. 19, 2020.

(30) Foreign Application Priority Data

Jun. 25, 2019 (JP) .................................. 2019-117391

(51) Int. Cl.
*H02K 1/16* (2006.01)
*H02K 1/27* (2022.01)
*H02K 5/22* (2006.01)

(52) U.S. Cl.
CPC .................. *H02K 1/16* (2013.01); *H02K 1/27* (2013.01); *H02K 5/225* (2013.01)

(58) Field of Classification Search
CPC ............. H02K 1/16; H02K 1/27; H02K 5/225
See application file for complete search history.

(56) References Cited

U.S. PATENT DOCUMENTS

2001/0033116 A1* 10/2001 Rose, Sr. ................ F02N 11/04
    310/180
2009/0267441 A1* 10/2009 Hiramatsu ........... H02K 15/066
    310/215

(Continued)

FOREIGN PATENT DOCUMENTS

CN          114530991 A   *  5/2022
FR          3096195 A1    * 11/2020   ............. H02K 1/148

(Continued)

OTHER PUBLICATIONS

Sep. 15, 2020 International Search Report issued in International Application No. PCT/JP2020/024191.

*Primary Examiner* — Forrest M Phillips
(74) *Attorney, Agent, or Firm* — Oliff PLC

(57) ABSTRACT

A motor includes a stator that includes a stator core and coils. The stator core is formed of a magnetic material and has a plurality of teeth arranged at intervals in a circumferential direction. The coils are formed of electrically-conductive windings wound around the teeth. Moreover, the motor also includes a rotor having a plurality of magnets arranged in radial opposition to the stator core and at intervals in the circumferential direction. The rotor is configured to rotate upon supply of electric current to the coils. Furthermore, the motor also includes a plurality of pseudo-teeth formed of a magnetic material and each located in a circumferentially intermediate area between a circumferentially-adjacent pair of the teeth. The pseudo-teeth are arranged so as to be concentrated in a part of the stator core in the circumferential direction.

5 Claims, 41 Drawing Sheets

(56) References Cited

U.S. PATENT DOCUMENTS

| | | | |
|---|---|---|---|
| 2010/0225112 A1 | 9/2010 | Hayakawa | |
| 2011/0025162 A1* | 2/2011 | Naganawa | H02K 3/28 |
| | | | 310/195 |
| 2014/0319942 A1* | 10/2014 | Nakayama | H02K 1/185 |
| | | | 310/71 |
| 2015/0013149 A1* | 1/2015 | Hashimoto | H02K 15/045 |
| | | | 29/605 |
| 2017/0077792 A1 | 3/2017 | Ueda et al. | |
| 2017/0207674 A1* | 7/2017 | Peng | H02K 1/148 |
| 2018/0337574 A1* | 11/2018 | Altindis | H02K 5/24 |
| 2020/0014288 A1* | 1/2020 | Hotta | H02K 3/522 |

FOREIGN PATENT DOCUMENTS

| | | |
|---|---|---|
| JP | S60-119887 U | 8/1985 |
| JP | S63-088073 U | 6/1988 |
| JP | S64-050673 U | 3/1989 |
| JP | H05-045099 Y2 | 11/1993 |
| JP | 2000-102197 A | 4/2000 |
| JP | 2002-013566 A | 1/2002 |
| JP | 2010-207046 A | 9/2010 |
| JP | 2015-133775 A | 7/2015 |
| JP | 2016-019389 A | 2/2016 |
| WO | 2019/064373 A1 | 4/2019 |

\* cited by examiner

MOTOR

CROSS-REFERENCE TO RELATED APPLICATIONS

The present application is a continuation application of International Application No. PCT/JP2020/024191 filed on Jun. 19, 2020, which is based on and claims priority from Japanese Patent Application No. 2019-117391 filed on Jun. 25, 2019. The entire contents of these applications are incorporated by reference into the present application.

BACKGROUND

1 Technical Field

The present disclosure relates to motors.

2 Description of Related Art

Japanese Patent Application Publication No. JP 2016-019389 A discloses a motor in which a rotor is arranged radially inside a stator. The stator includes a plurality of winding magnetic poles each having a winding wound thereon and a plurality of non-winding magnetic poles each having no winding wound thereon. Each of the non-winding magnetic poles is arranged between a circumferentially-adjacent pair of the winding magnetic poles. Moreover, the non-winding magnetic poles are arranged at constant intervals in the circumferential direction. Consequently, it becomes possible to suppress vibration and resonance, which are caused by a large circumferential pitch between the exciting-force peaks, without deteriorating the cogging torque, the induced-voltage distortion and the winding factor and without increasing adverse effects due to the multipolarization.

SUMMARY

A configuration where non-winding magnetic poles are provided as in the stator disclosed in the aforementioned patent document is effective in terms of suppressing vibration and resonance. However, there is room for improvement in terms of obtaining desired cogging-torque characteristics.

The present disclosure has been accomplished in consideration of the above fact.

According to the present disclosure, there is provided a motor that includes: a stator including a stator core and coils, the stator core being formed of a magnetic material and having a plurality of teeth arranged at intervals in a circumferential direction, the coils being formed of electrically-conductive windings wound around the teeth; a rotor having a plurality of magnets arranged in radial opposition to the stator core and at intervals in the circumferential direction, the rotor being configured to rotate upon supply of electric current to the coils; and a plurality of pseudo-teeth formed of a magnetic material and each located in a circumferentially intermediate area between a circumferentially-adjacent pair of the teeth, the pseudo-teeth being arranged so as to be concentrated in a part of the stator core in the circumferential direction.

With the above configuration, it becomes possible to obtain desired cogging-torque characteristics.

DESCRIPTION OF EMBODIMENTS

First Embodiment

Figure 1:
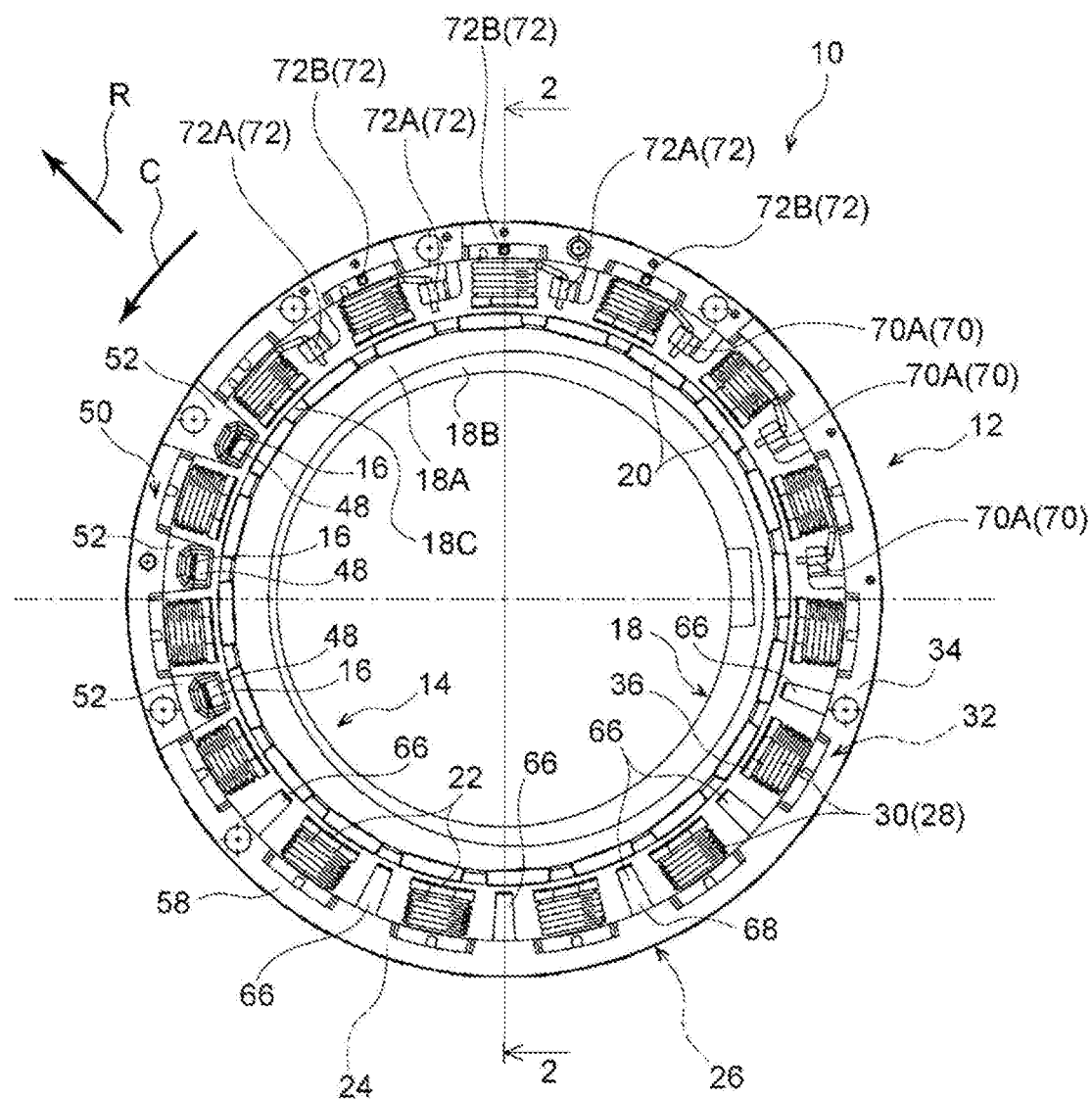
FIG. 1 is a plan view showing a stator and a rotor that constitute a motor according to a first embodiment.

A motor 10 according to the first embodiment of the present disclosure will be described with reference to FIGS. 1-7. In addition, the arrows Z, R and C suitably shown in the drawings respectively indicate one side in a rotation axial direction, the outer side in a rotation radial direction and one side in a rotation circumferential direction of a rotor 14 that will be described later. Moreover, in the case of merely indicating the axial direction, the radial direction and the circumferential direction, unless specified otherwise, the arrows Z, R and C respectively indicate the rotation axial direction, the rotation radial direction and the rotation circumferential direction of the rotor 14.

Figure 2:
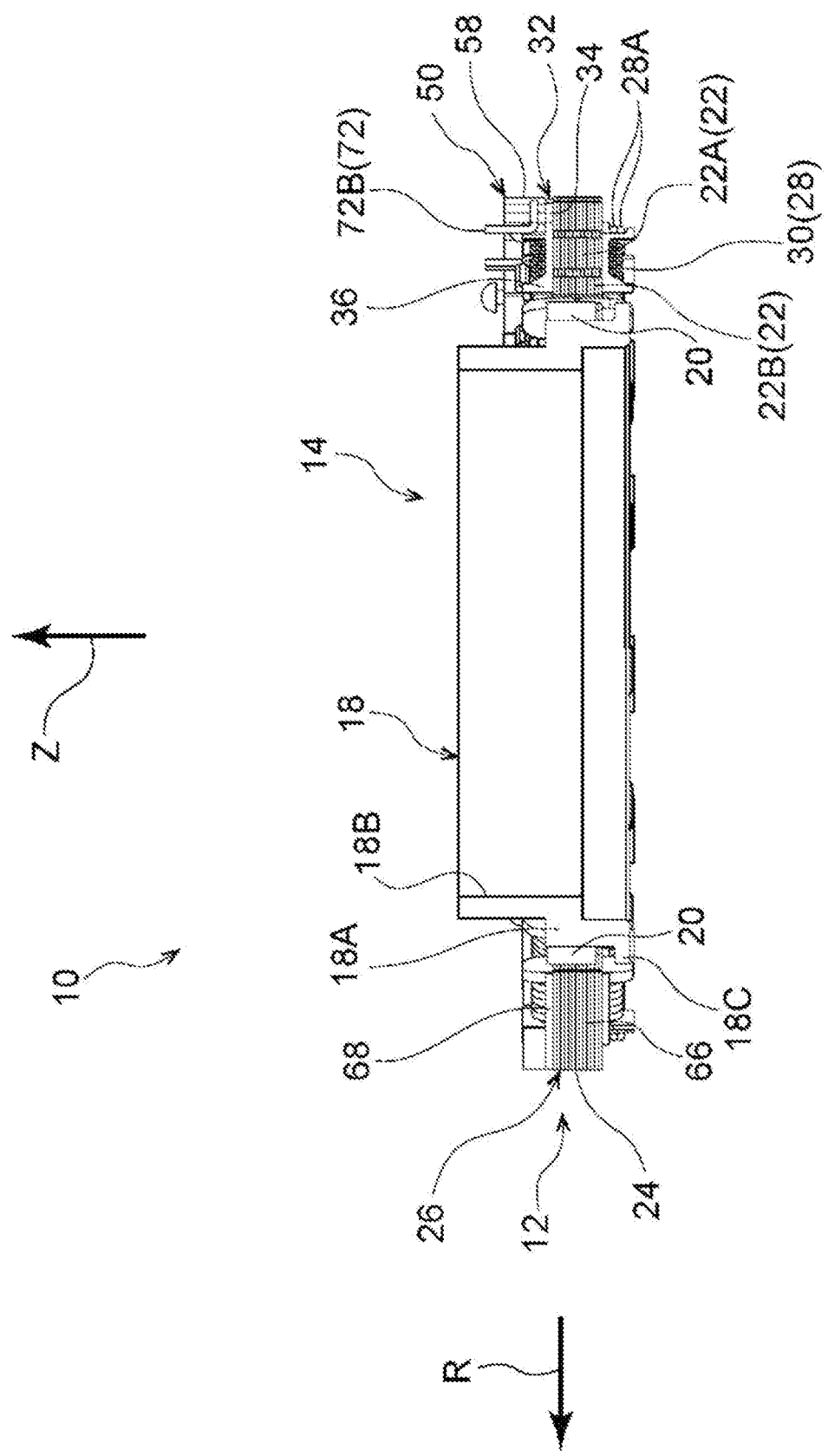
FIG. 2 is a side cross-sectional view showing a cross section of the stator and the rotor along the line 2-2 shown in FIG. 1.
Figure 3:
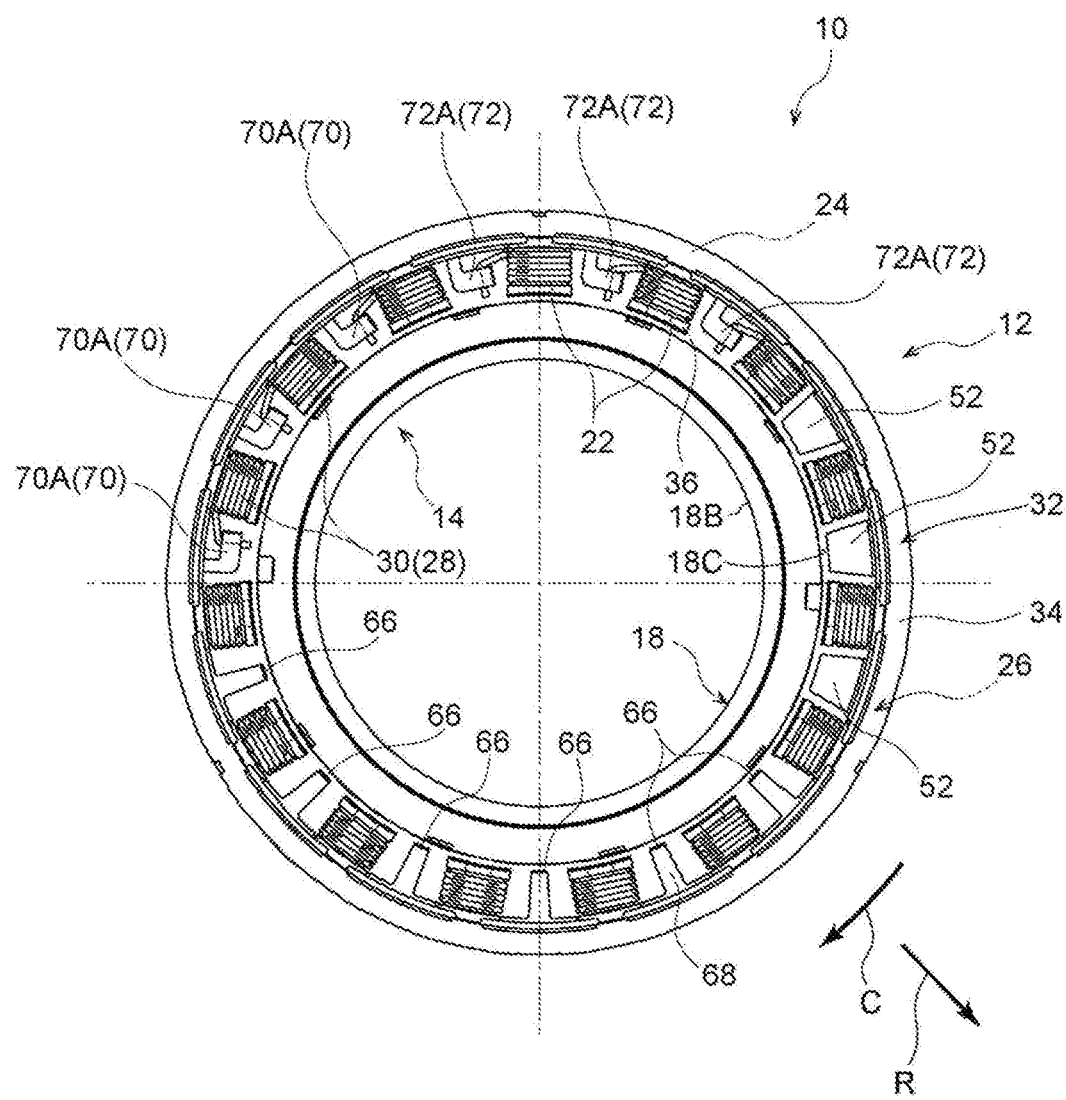
FIG. 3 is a bottom view showing the stator and the rotor that constitute the motor according to the first embodiment.

As shown in FIGS. 1-3, the motor 10 according to the present embodiment is a 3-phase, 20-pole and 15-slot motor which is designed to be used as an actuator in a vehicle. The motor 10 includes a stator 12, the aforementioned rotor 14 that rotates upon generation of magnetism (or magnetic field) by the stator 12, and sensors 16 (i.e., magnetic sensors) for detecting the rotation angle of the rotor 14.

The number of poles of the rotor 14 is set to 20. The rotor 14 is arranged radially inside the stator 12 that will be described later. The rotor 14 includes an annular rotor core 18 fixed on a rotating shaft that is not shown in the drawings, and a plurality (e.g., 20) of magnets 20 fixed to an outer peripheral part of the rotor core 18. As shown in FIG. 2, the rotor core 18 has a large-diameter portion 18A formed in a tubular shape, and a small-diameter portion 18B which protrudes from a radially inner part of the large-diameter portion 18A on the one side in the axial direction toward the one side in the axial direction and whose inner and outer diameters are set to be respectively smaller than the inner and outer diameters of the large-diameter portion 18A. Moreover, the rotor core 18 also has a flange portion 18C that protrudes radially outward from the large-diameter portion 18A on the other side in the axial direction. As shown in FIGS. 1 and 2, the magnets 20 are formed to have a rectangular shape when viewed from the radially outer side. Moreover, the magnets 20 are arranged at constant intervals in the circumferential direction. That is, the magnets 20 are arranged at equal intervals in the circumferential direction. The magnets 20 are fixed to an outer circumferential surface of the large-diameter portion 18A of the rotor core 18. It should be noted that in FIG. 2, hatching of the cross section is omitted.

Figure 4:
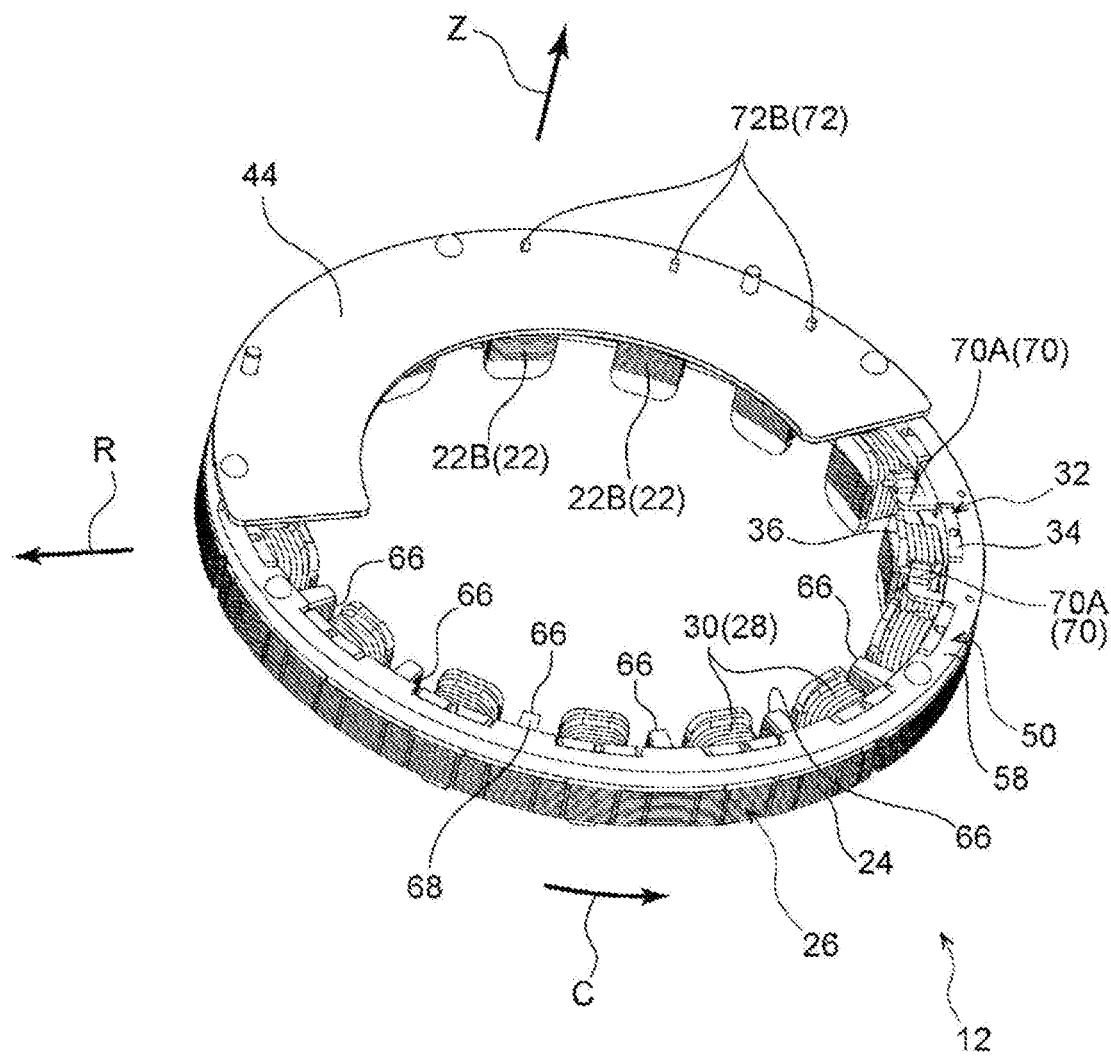
FIG. 4 is a perspective view showing the stator with a circuit board mounted thereto.
Figure 5:
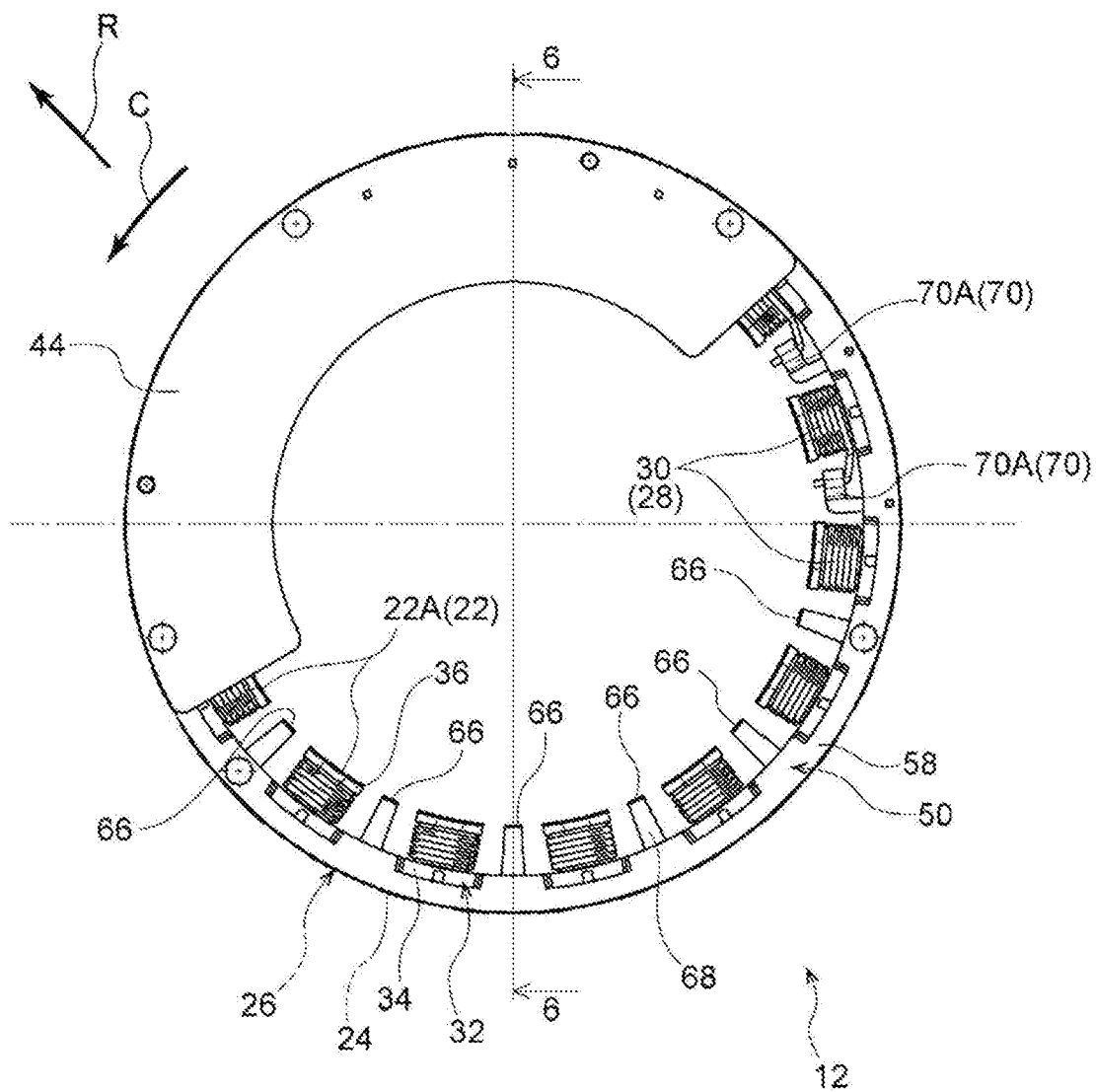
FIG. 5 is a plan view showing the stator with the circuit board mounted thereto.
Figure 6:
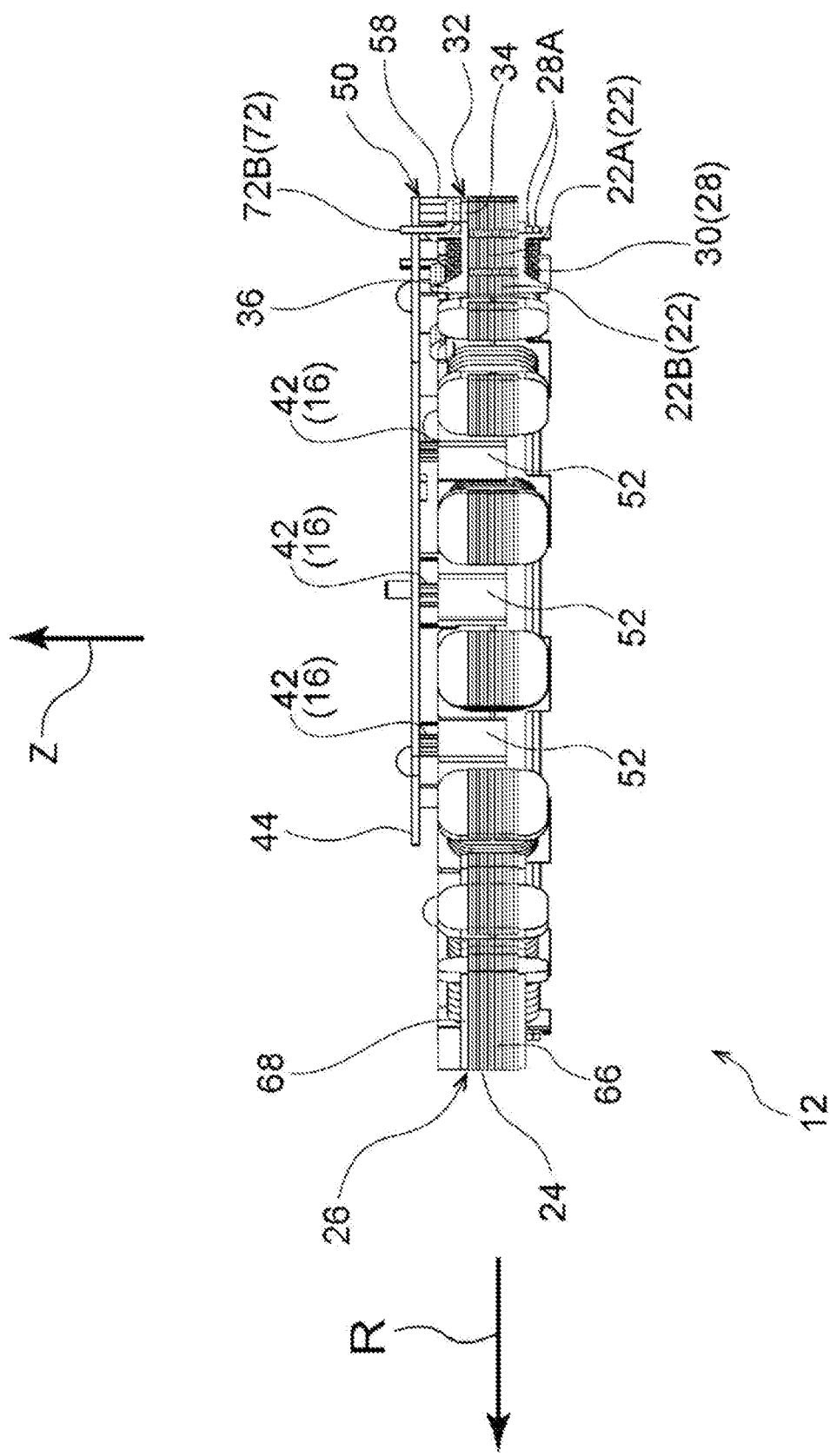
FIG. 6 is a side cross-sectional view showing a cross section of the stator along the line 6-6 shown in FIG. 5.

As shown in FIGS. 4-6, the stator 12 includes a stator core 26 that has a back core 24 formed in an annular shape and a plurality (e.g., 15) of teeth 22 and a plurality (e.g., 6) of pseudo-teeth 66 which protrude radially inward from an inner circumferential surface of the back core 24. In the present embodiment, the stator core 26 is a laminated core that is formed by laminating magnetic steel sheets in the axial direction. Moreover, the stator 12 also includes an insulator 32 mounted to the stator core 26 and coils 30 that are formed by winding electrically-conductive windings 28 around the teeth 22 of the stator core 26.

Figure 7:
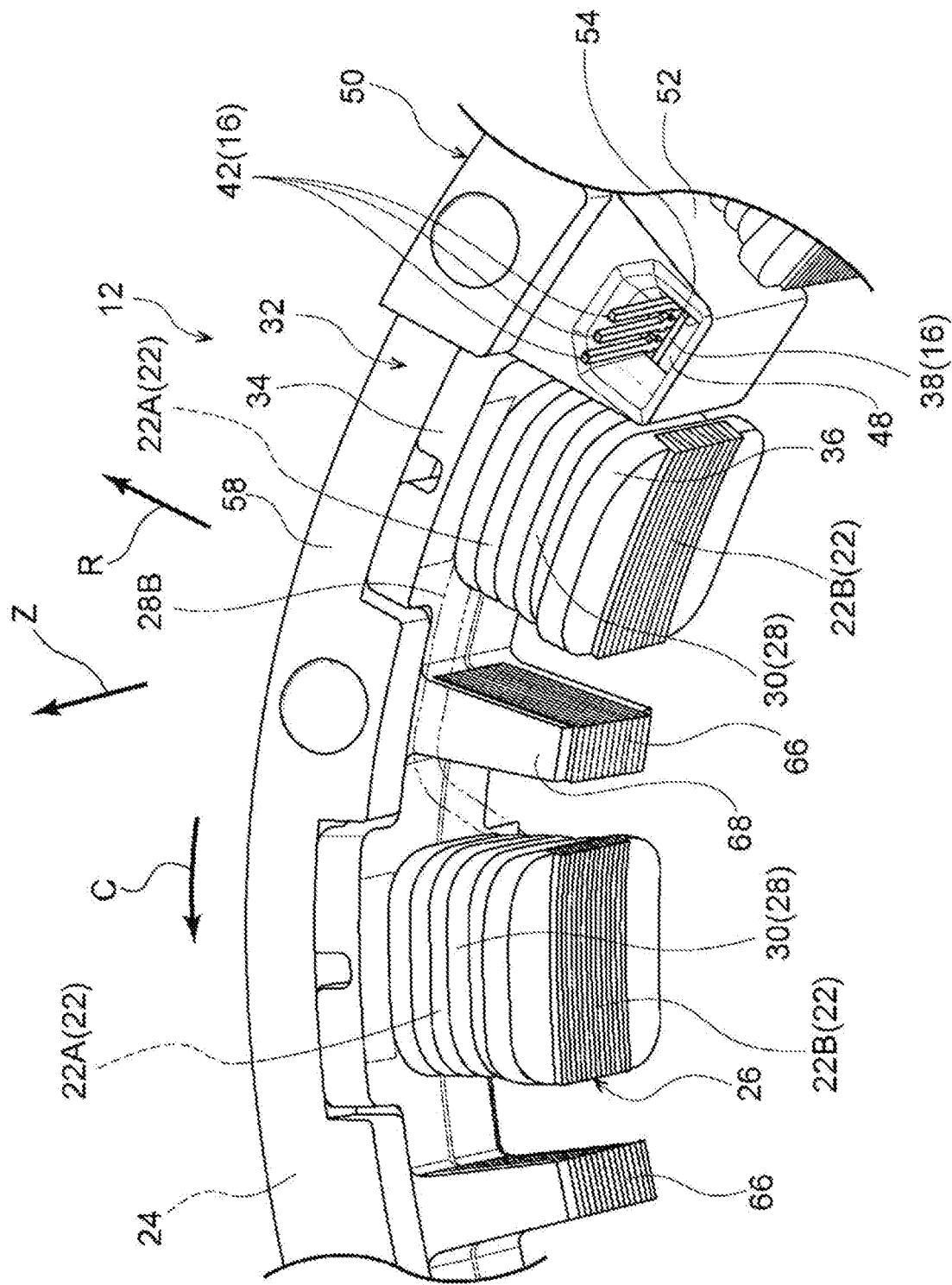
FIG. 7 is an enlarged perspective view showing part of the stator in the circumferential direction through enlargement.
Figure 10:
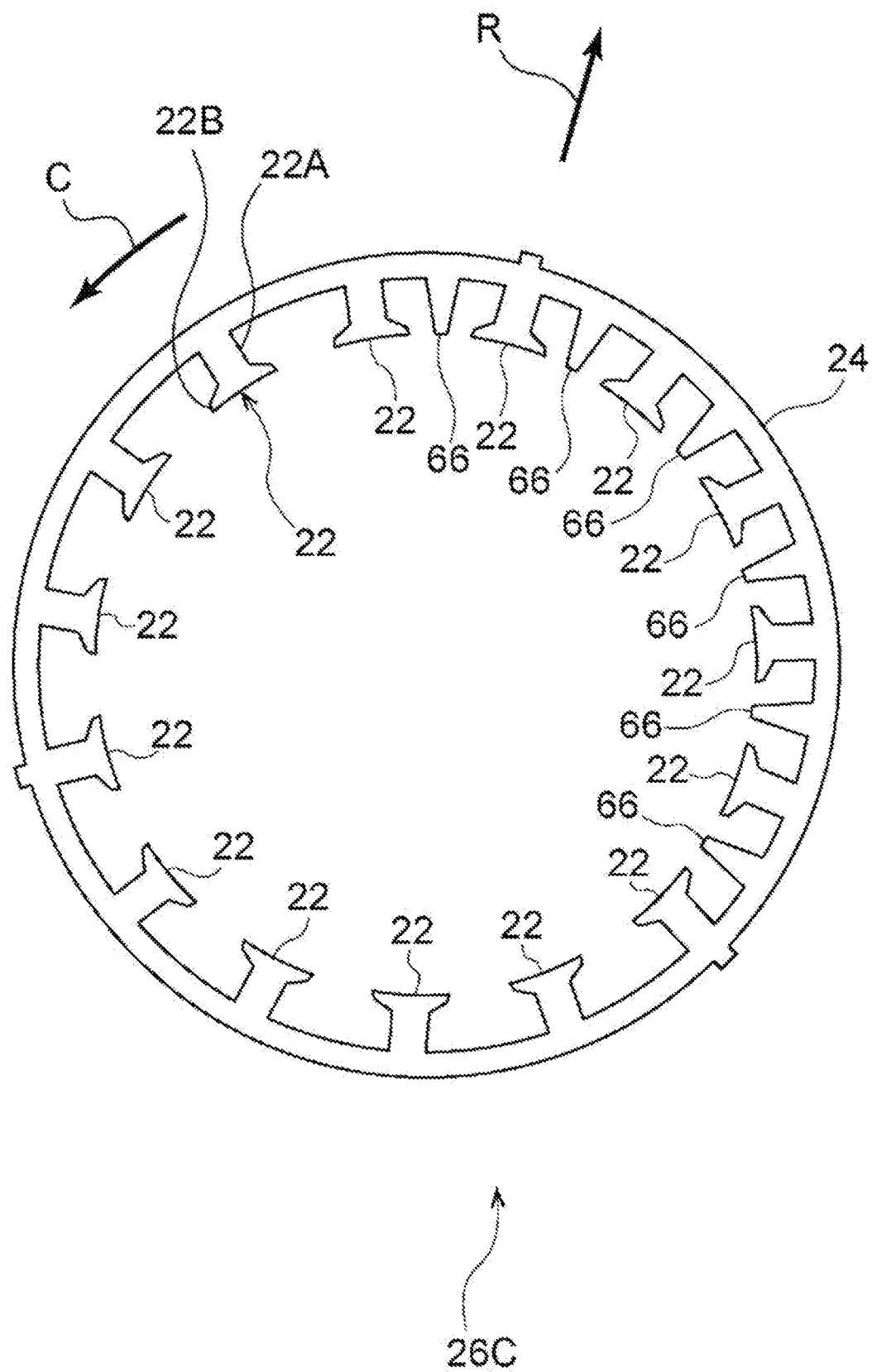
FIG. 10 is a plan view showing a stator core of a motor according to a third analytical model.
Figure 11:
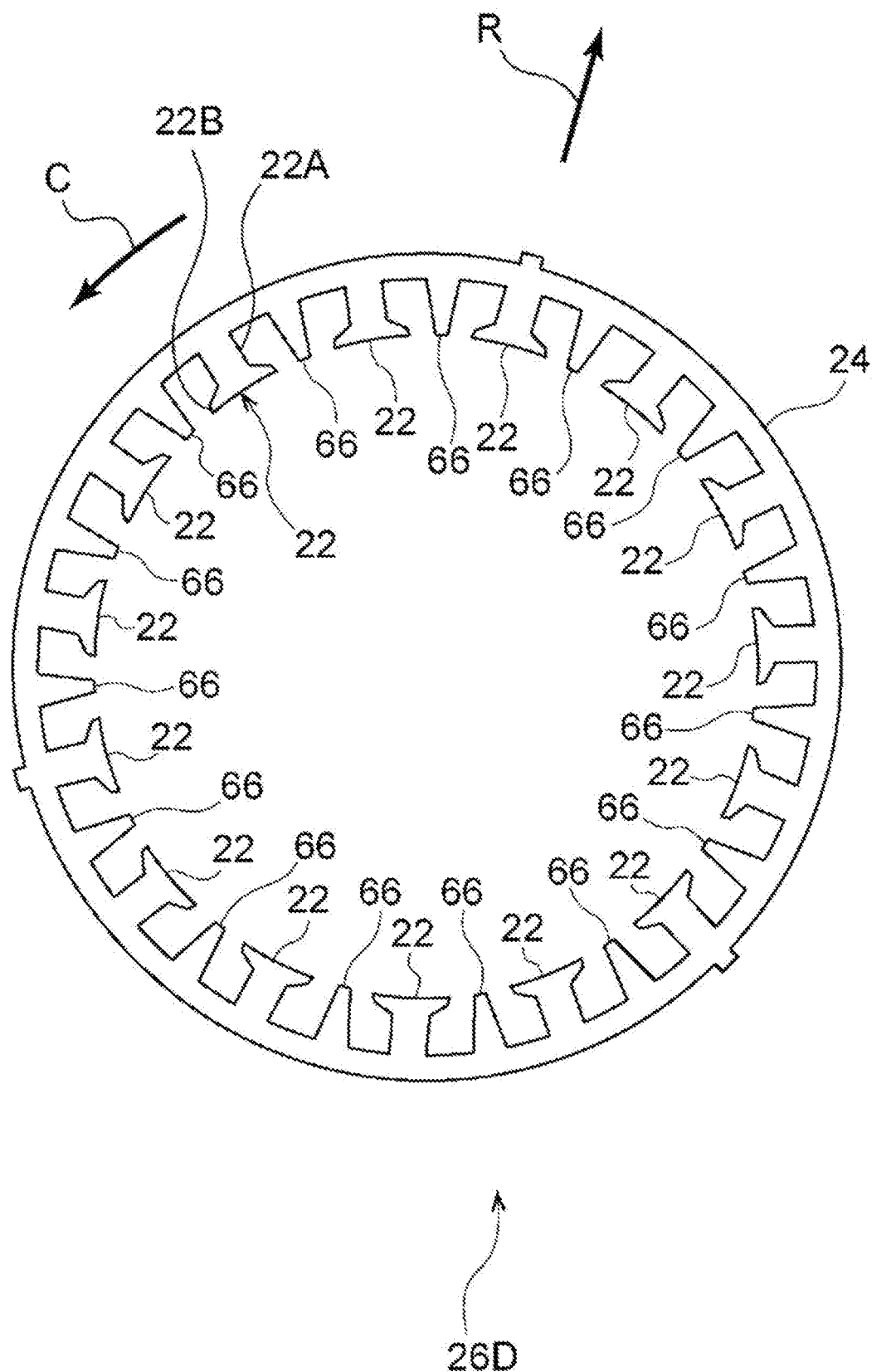
FIG. 11 is a plan view showing a stator core of a motor according to a fourth analytical model.

As shown in FIGS. 6 and 7, the teeth 22 of the stator core 26 are formed to have a substantially T-shape (see also FIG. 10) when viewed along the axial direction. The teeth 22 are arranged at equal intervals in the circumferential direction. Each of the teeth 22 has a prismatic winding portion 22A protruding radially inward from the inner circumferential surface of the back core 24 and a distal end portion 22B extending from a radially inner end of the winding portion 22A to both sides in the circumferential direction. The distal end portion 22B has a radially inner surface curved with a predetermined radius of curvature in the circumferential direction.

Each of the pseudo-teeth 66 of the stator core 26 is formed in a substantially equilateral trapezoidal shape such that both axial end faces (i.e., bottom faces) thereof taper radially inward. As shown in FIG. 5, in the present embodiment, the six pseudo-teeth 66 are arranged in a part of the stator core 26 corresponding to seven circumferentially-consecutive teeth 22 such that each of the pseudo-teeth 66 is located between a circumferentially-adjacent pair of the teeth 22. That is, the six pseudo-teeth 66 are arranged so as to be concentrated in a part of the stator core 26 in the circumferential direction. Moreover, radially inner surfaces of the pseudo-teeth 66 are curved with the same radius of curvature as the radially inner surfaces of the distal end portions 22B of the teeth 22 in the circumferential direction, and located at the same radial position as the radially inner surfaces of the distal end portions 22B of the teeth 22. In addition, the dimension from the end face on the one axial side to the end face on the other axial side in each of the pseudo-teeth 66 is set such that the axial end faces of each of the pseudo-teeth 66 do not protrude respectively to the one axial side and the other axial side with respect to the coil ends (i.e., both the axial ends of each of the coils 30).

The insulator 32 mounted to the stator core 26 is formed of an electrically-insulative material such as a resin material. The insulator 32 has a structure of being divided into two pieces in the axial direction. The insulator 32 has back-core covering portions 34 that respectively cover axial end faces of the back core 24, and tooth covering portions 36 that respectively cover axial end faces of the winding portions 22A of the teeth 22, axial end faces of the distal end portions 22B of the teeth 22 and circumferential end faces of the winding portions 22A of the teeth 22. Moreover, the insulator 32 also has pseudo-tooth covering portions 68 that respectively cover axial end faces of the pseudo-teeth 66.

The coils 30 are formed by winding the electrically-conductive windings 28 around the winding portions 22A of the teeth 22 covered with the tooth covering portions 36 of the insulator 32. In the present embodiment, there are formed fifteen coils 30 respectively around the winding portions 22A of the fifteen teeth 22. As shown in FIG. 1, in the present embodiment, the windings 28 constituting the coils 30 for respective phases are connected together via three neutral-point terminals 70. Moreover, each of distal end portions of the windings 28 constituting the coils 30 for respective phases is connected with a corresponding one of three circuit-board connection terminals 72. As shown in FIG. 6, in the present embodiment, a bridging wire 28A (i.e., a portion of the windings 28) connecting one of the coils 30 and another of the coils 30 is extended (or routed) along an outer peripheral part of the back-core covering portion 34 of the insulator 32 on the other side in the axial direction. Moreover, as shown in FIG. 7, a bridging wire 28B (i.e., another portion of the windings 28) connecting one of the coils 30 and another of the coils 30 is extended (or routed) along one of the pseudo-teeth 66 via the corresponding pseudo-tooth covering portion 68 of the insulator 32.

As shown in FIG. 7, the sensors 16 of the present embodiment are so-called lead-type magnetic sensors. Each of the sensors 16 includes a sensor body 38 that is formed in the shape of a rectangular block. A central portion of the sensor body 38 constitutes a sensing point for sensing the magnetism of the magnets 20. Moreover, each of the sensors 16 also includes a plurality (e.g., 3 in the present embodiment) of legs 42 that protrude from the sensor body 38 toward one side thereof. Each of the sensors 16 is mounted to a circuit board 44 by soldering end portions of the legs 42, on the opposite side thereof to the sensor body 38, to the circuit board 44 (see FIG. 4). As shown in FIGS. 4 and 5, in the present embodiment, the circuit board 44 is formed in a substantially U-shape so as to extend both radially and circumferentially with its thickness direction coinciding with the axial direction. When viewed along the axial direction, the circuit board 44 covers part of the stator 12 in the circumferential direction. Moreover, in the present embodiment, the three sensors 16 are mounted to the circuit board 44 such that they are located at equal intervals in the circumferential direction. Furthermore, in the state of having been mounted to the circuit board 44, the three sensors 16 protrude from the circuit board 44 to the other side in the axial direction.

As shown in FIG. 7, on the radially inner side of the sensor body 38 of each of the sensors 16, there is provided a magnetism converging member 48 in close proximity to the sensor body 38 to converge the magnetism of the magnets 20 (see FIG. 1) of the rotor 14. The magnetism converging member 48 is formed of a magnetic material, such as iron, in a rectangular plate shape or a rectangular block shape.

The sensor bodies 38 of the sensors 16 and the magnetism converging members 48 are held (or supported) by a busbar 50 that is mounted to the insulator 32. Moreover, as shown in FIG. 1, the aforementioned neutral-point terminals 70 and circuit-board connection terminals 72 are also held (supported) by the busbar 50.

As shown in FIGS. 1 and 7, the busbar 50 is formed of an electrically-insulative material such as a resin material. The busbar 50 has a fixed annular portion 58 that is formed in an annular shape. The busbar 50 is fixed to the insulator 32 with the annular portion 58 fixed to the back-core covering portion 34 of the insulator 32 on the one side in the axial direction.

Moreover, the busbar 50 also has three sensor-holding portions 52 each protruding from the fixed annular portion 58 radially inward and toward the other side in the axial direction. Each of the sensor-holding portions 52 is formed in a prismatic shape such that both axial end faces (i.e., bottom faces) thereof are shaped in an equilateral trapezoid tapering radially inward. On the radially inner side in each of the sensor-holding portions 52, there is formed a sensor insertion hole 54 that opens on the one side in the axial direction. Moreover, in the present embodiment, a corresponding one of the magnetism converging members 48 is held in a radially inner space on the closed end side (i.e., the other side in the axial direction) in the sensor insertion hole 54. Further, the sensor body 38 of a corresponding one of the sensors 16 is held in a radially outer space on the closed end side (i.e., the other side in the axial direction) in the sensor insertion hole 54. Furthermore, in a state of the busbar 50 having been fixed to the insulator 32, the three sensor-holding portions 52 are arranged so as to be concentrated in a part of the stator core 26 which corresponds to four consecutive teeth 22; the part of the stator core 26 where the three sensor-holding portions 52 are concentrated is on the other side of that part of the stator core 26 where the pseudo-teeth 66 are arranged in the circumferential direction. Moreover, each of the three sensor-holding portions 52 is located between a circumferentially-adjacent pair of the teeth 22. Consequently, the sensor bodies 38 of the sensors 16 held respectively in the three sensor-holding portions 52 are arranged so as to be concentrated in a part of the stator core 26 in the circumferential direction.

As shown in FIG. 1, the three circuit-board connection terminals 72 are held by the fixed annular portion 58 of the busbar 50. Moreover, in the state of the busbar 50 having been fixed to the insulator 32, portions 72A of the three circuit-board connection terminals 72 are arranged so as to be concentrated in a part of the stator core 26 corresponding to four consecutive teeth 22 on the other side of that part of the stator core 26 in the circumferential direction where the sensor-holding portions 52 are arranged; to the portions 72A, there are connected the distal end portions of the windings 28. Furthermore, each of the portions 72A of the three circuit-board connection terminals 72, to which the distal end portions of the windings 28 are connected, is located between a circumferentially-adjacent pair of the teeth 22. On the other hand, portions 72B of the three circuit-board connection terminals 72, which are connected to the circuit board 44, protrude to the one side in the axial direction from portions corresponding to the teeth 22 in the circumferential direction.

The three neutral-point terminals 70 are also held by the fixed annular portion 58 of the busbar 50. Moreover, in the state of the busbar 50 having been fixed to the insulator 32, portions 70A of the three neutral-point terminals 70 are arranged so as to be concentrated in a part of the stator core 26 corresponding to four consecutive teeth 22 on the other side of that part of the stator core 26 in the circumferential direction where the circuit-board connection terminals 72 (more specifically, the portions 72A to which the distal end portions of the windings 28 are connected) are arranged; the portions 70A connect between the windings 28. Furthermore, each of the portions 70A of the three neutral-point terminals 70, which connect between the windings 28, is located between a circumferentially-adjacent pair of the teeth 22.

Next, operation and effects of the motor 10 according to the present embodiment will be described.

As shown in FIGS. 1-3, in the motor 10 according to the present embodiment, upon supply of electric current to the coils 30 of the stator 12, a rotating magnetic field is generated around the stator 12, causing the rotor 14 to rotate.

With rotation of the rotor 14, the magnets 20 of the rotor 14 successively pass through the radially inner side of the sensor body 38 of each of the sensors 16. Then, change in the magnetic flux density of the magnets 20 at the position of the sensor body 38 thereof is detected by each of the sensors 16. Consequently, the rotation angle and/or the rotational speed of the rotor 14 can be calculated based on the detection results.

Moreover, in the present embodiment, each of the magnetism converging members 48 for converging the magnetism of the magnets 20 of the rotor 14 is provided in close proximity to the sensor body 38 of a corresponding one of the sensors 16. Consequently, it becomes possible to suppress variation in the detection of change in the magnetism of the magnets 20 by the sensors 16.

Furthermore, in the present embodiment, the six pseudo-teeth 66 each having no coil 30 formed therearound are arranged so as to be concentrated in a part of the stator core 26 in the circumferential direction. Consequently, it becomes possible to obtain desired cogging-torque characteristics while achieving high torque of the motor 10.

Here, analysis results of the relationship of the number of pseudo-teeth 66 with the torque of the motor and the cogging torque will be described.

In FIGS. 8-11, there are respectively shown a stator core 26A of a stator of a motor according to a first analytical model, a stator core 26B of a stator of a motor according to a second analytical model, a stator core 26C of a stator of a motor according to a third analytical model and a stator core 26D of a stator of a motor according to a fourth analytical model. It should be noted that the motors according to these analytical models are 3-phase, 20-pole and 15-slot motors. Moreover, it also should be noted that in the stator cores 26A, 26B, 26C and 26D of these analytical models, portions corresponding to those in the stator core 26 (see FIG. 1) of the above-described stator 12 are designated by the same reference numerals as the corresponding portions in the stator core 26.

Figure 8:
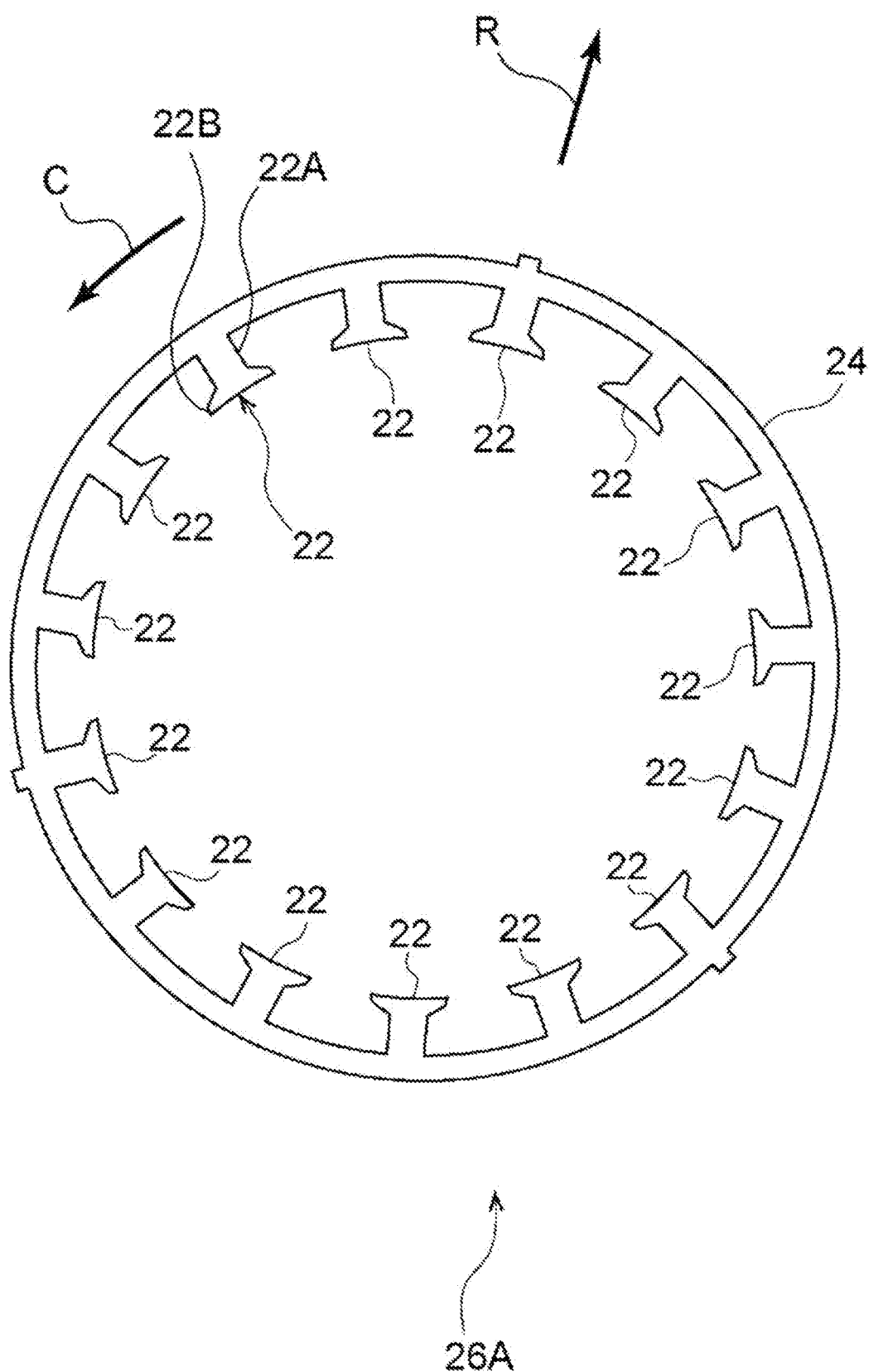
FIG. 8 is a plan view showing a stator core of a motor according to a first analytical model.
Figure 9:
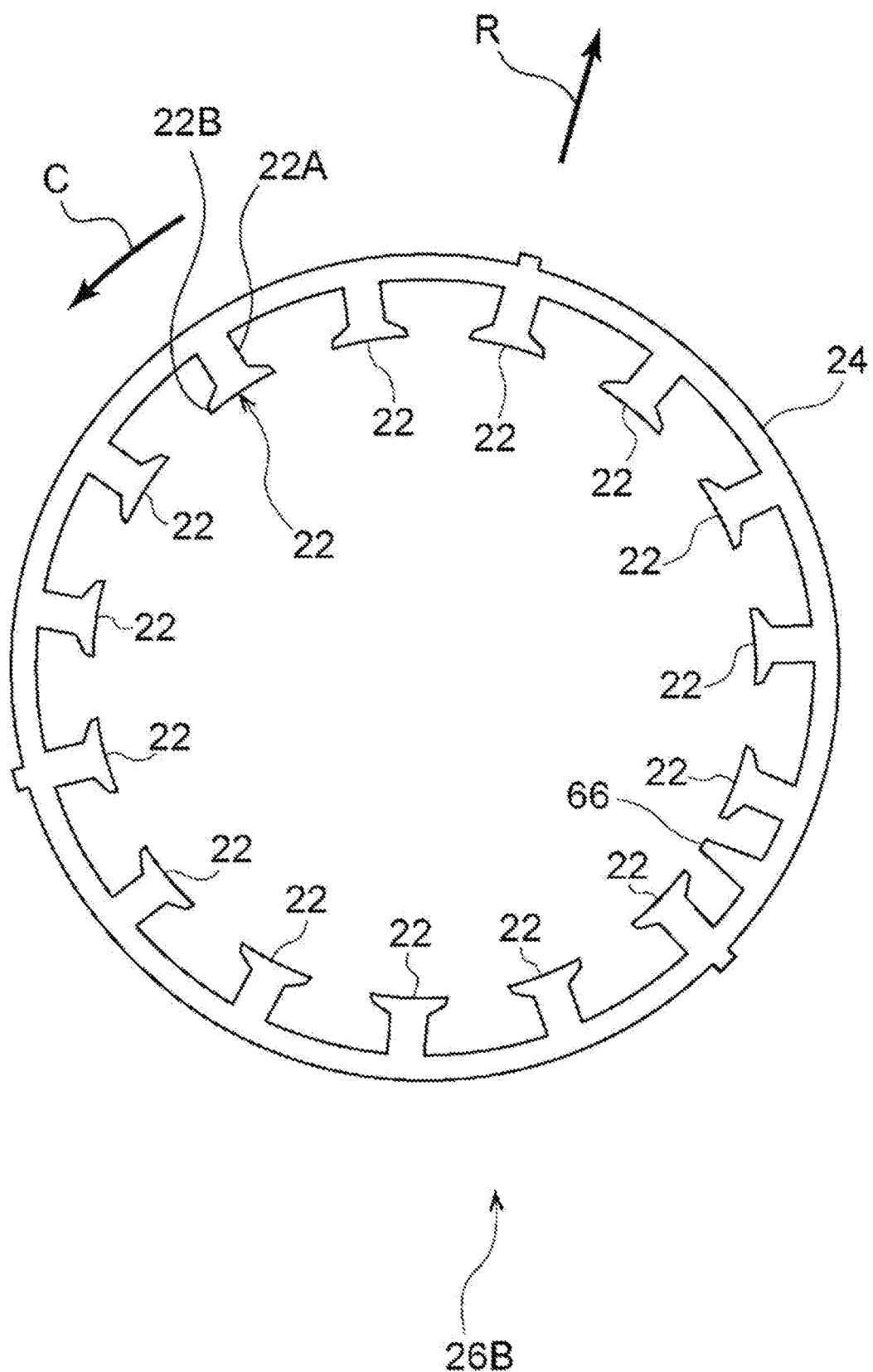
FIG. 9 is a plan view showing a stator core of a motor according to a second analytical model.

As shown in FIG. 8, the stator core 26A of the stator of the motor according to the first analytical model has no pseudo-tooth 66 provided therein. As shown in FIG. 9, the stator core 26B of the stator of the motor according to the second analytical model has only one pseudo-tooth 66 provided therein. As shown FIG. 10, the number of pseudo-teeth 66 provided in the stator core 26C of the stator of the motor according to the third analytical model is equal to 6. It should be noted that the stator core 26C of the stator of the motor according to the third analytical model has the same configuration as the stator core 26 (see FIG. 1) of the above-described stator 12. As shown FIG. 11, the number of pseudo-teeth 66 provided in the stator core 26D of the stator of the motor according to the fourth analytical model is equal to 15.

From comparison between the torques of the motors according to the first to the fourth analytical models, it has been found that the torque increases with increase in the number of pseudo-teeth 66.

Figure 12:
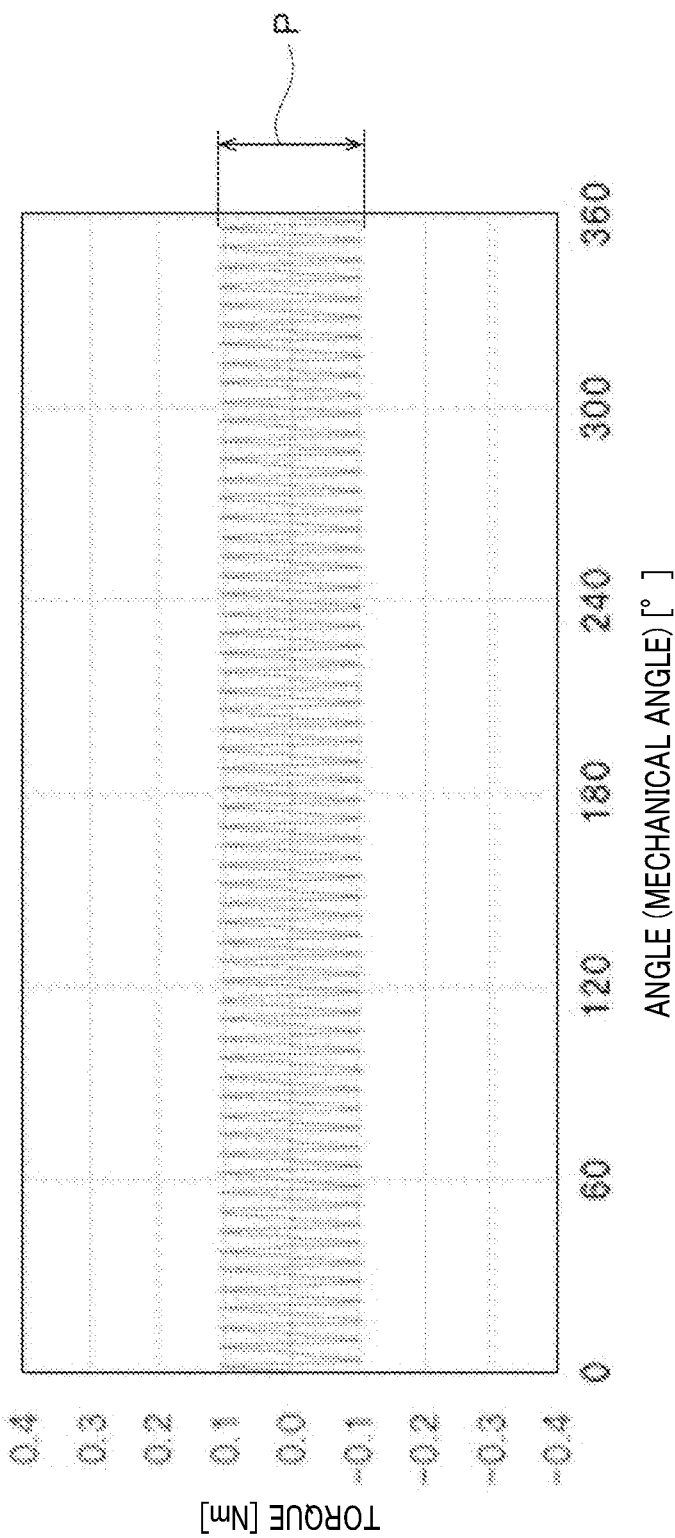
FIG. 12 is a graph showing the waveform of cogging torque of the motor according to the first analytical model.
Figure 13:
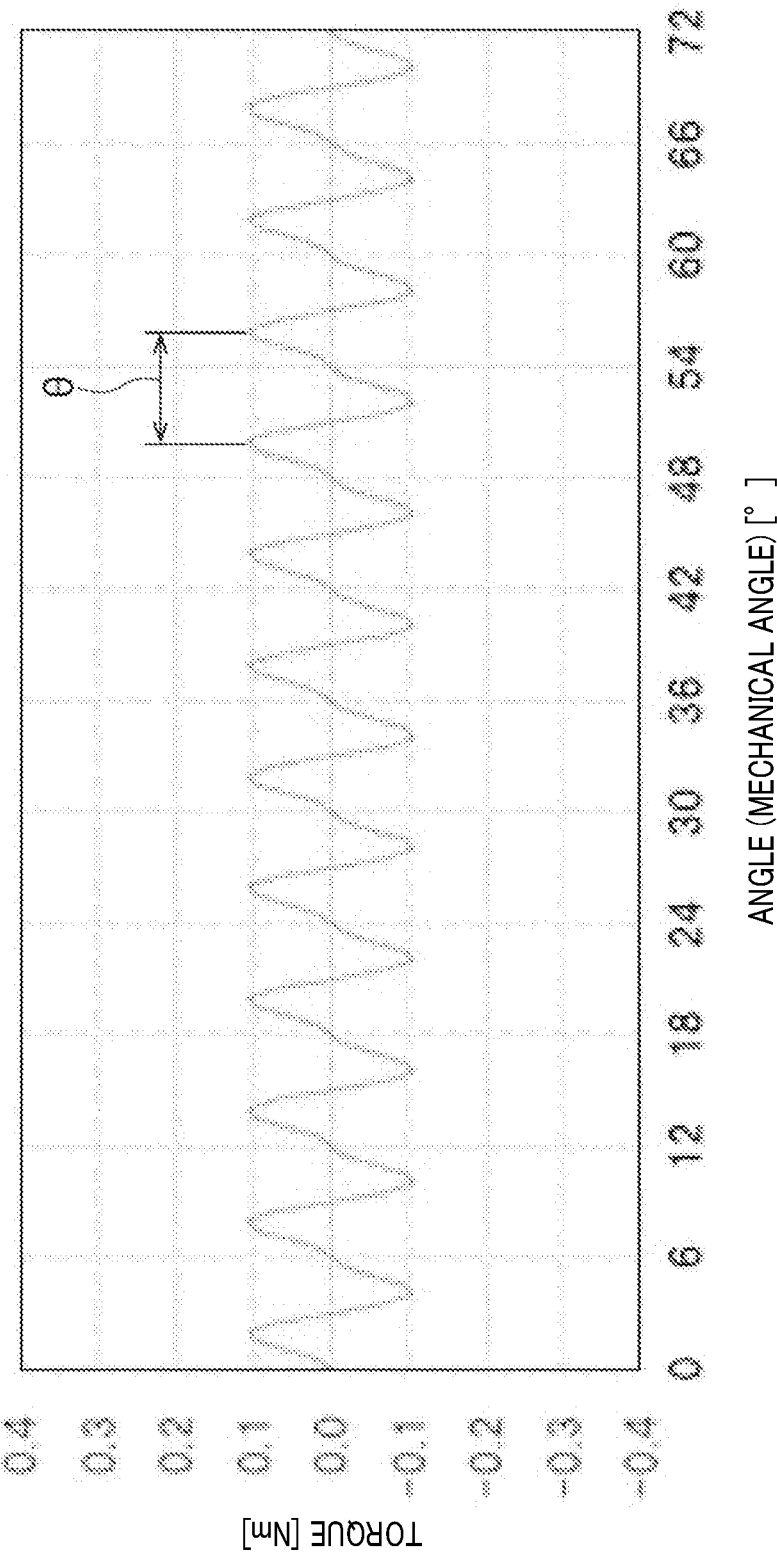
FIG. 13 is another graph showing the waveform of cogging torque of the motor according to the first analytical model, wherein the horizontal axis is enlarged compared to FIG. 12.

As shown in FIGS. 12 and 13, in the motor according to the first analytical model, the peak value P of the cogging torque was about 0.2 Nm and the angle θ between the peaks of the cogging torque was about 6°.

Figure 14:
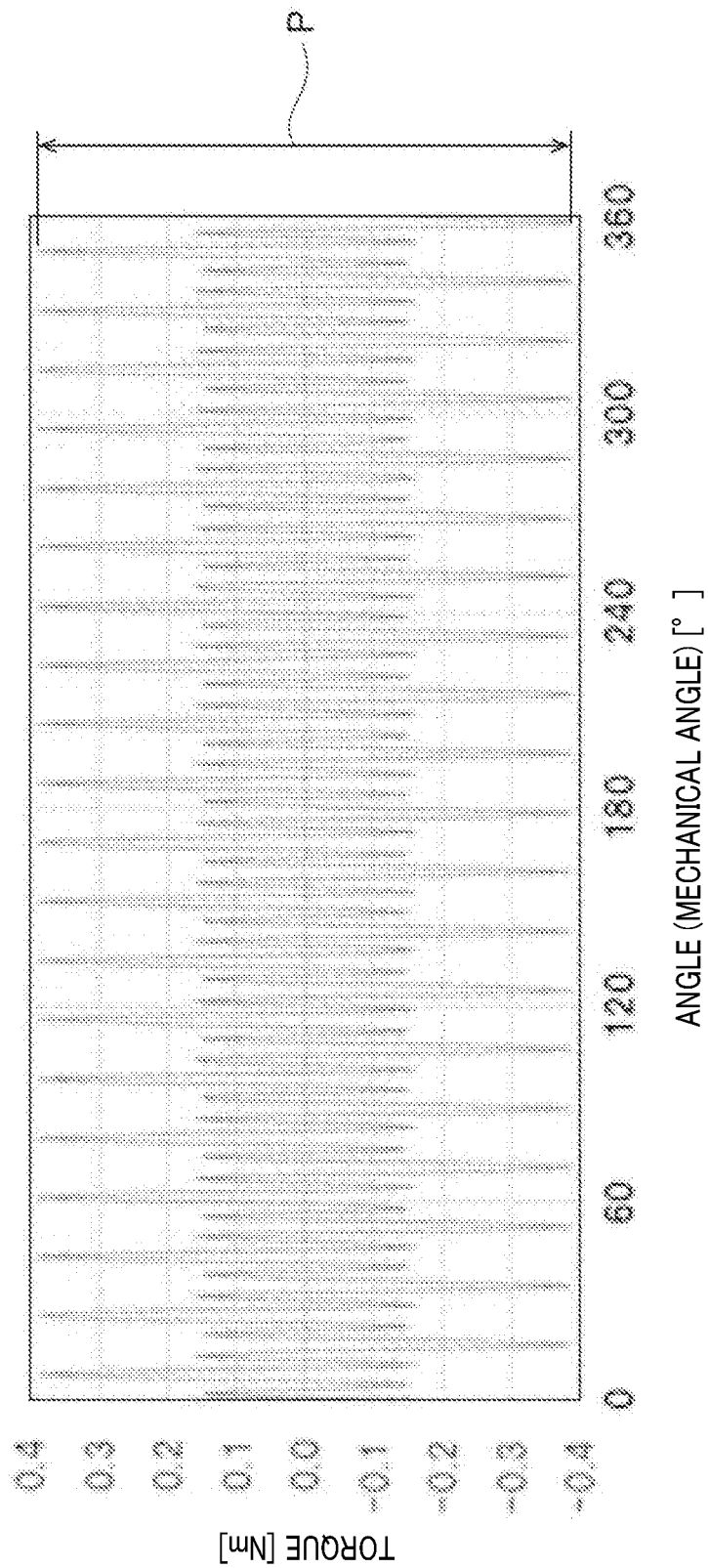
FIG. 14 is a graph showing the waveform of cogging torque of the motor according to the second analytical model.
Figure 15:
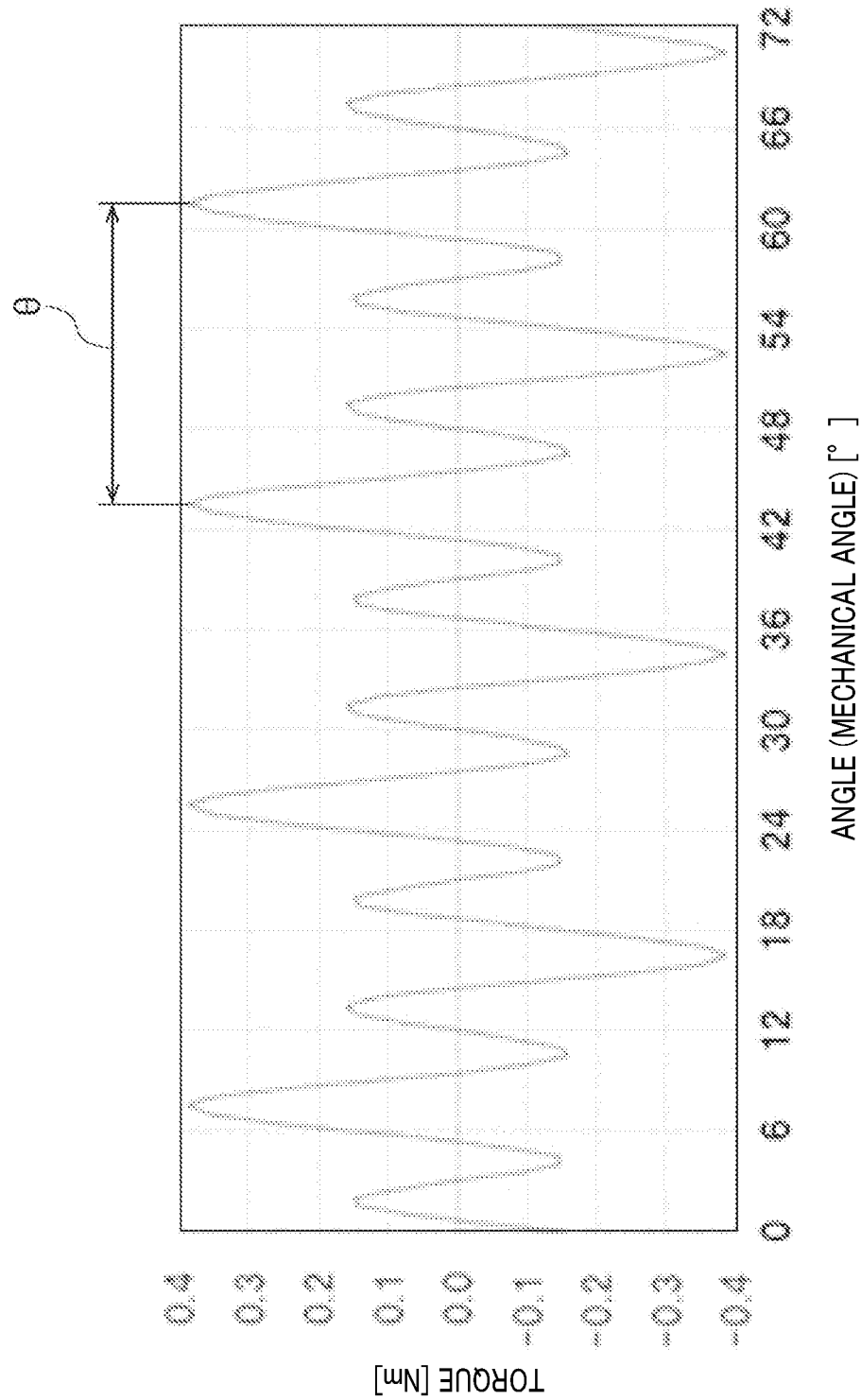
FIG. 15 is another graph showing the waveform of cogging torque of the motor according to the second analytical model, wherein the horizontal axis is enlarged compared to FIG. 14.

As shown in FIGS. 14 and 15, in the motor according to the second analytical model, the peak value P of the cogging torque was about 0.7 Nm and the angle θ between the peaks of the cogging torque was about 18°.

Figure 16:
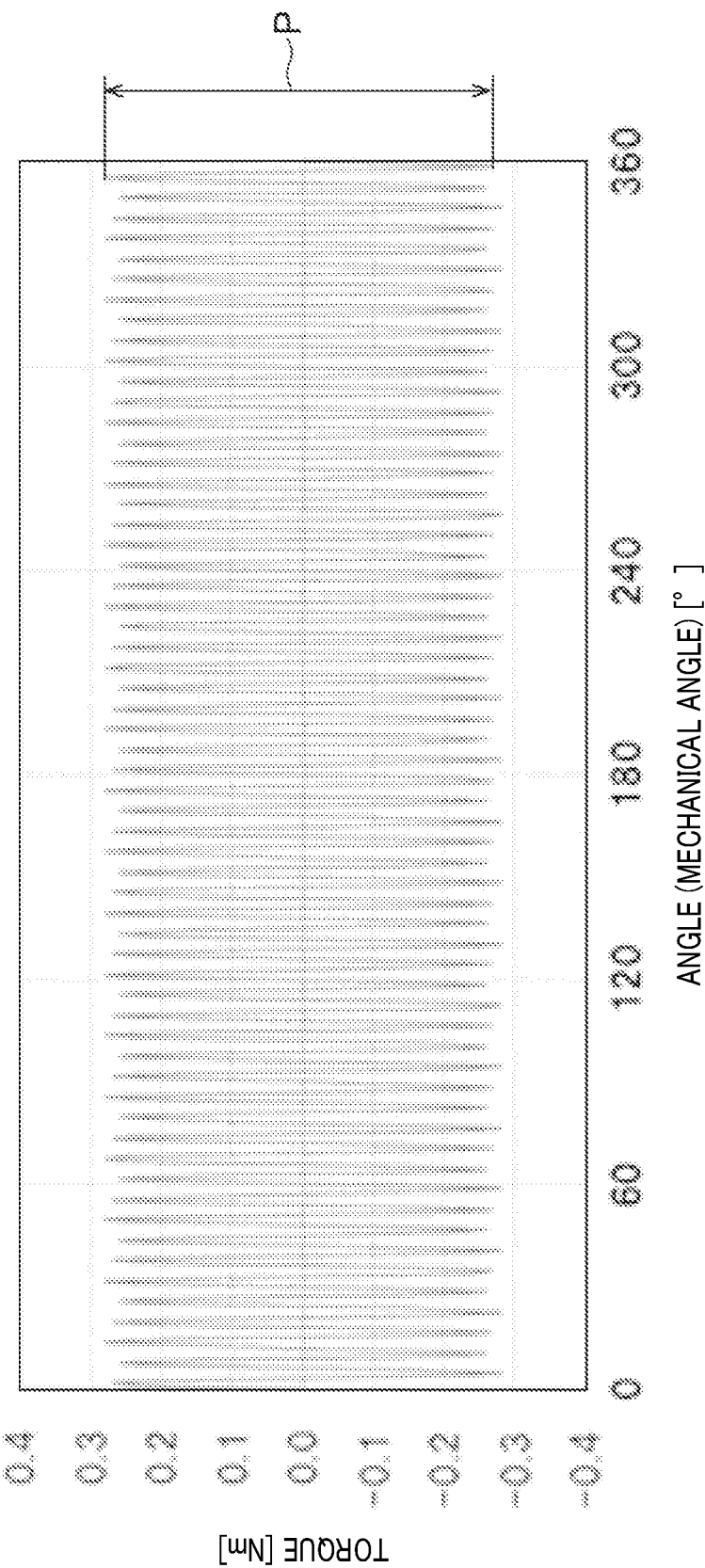
FIG. 16 is a graph showing the waveform of cogging torque of the motor according to the third analytical model.
Figure 17:
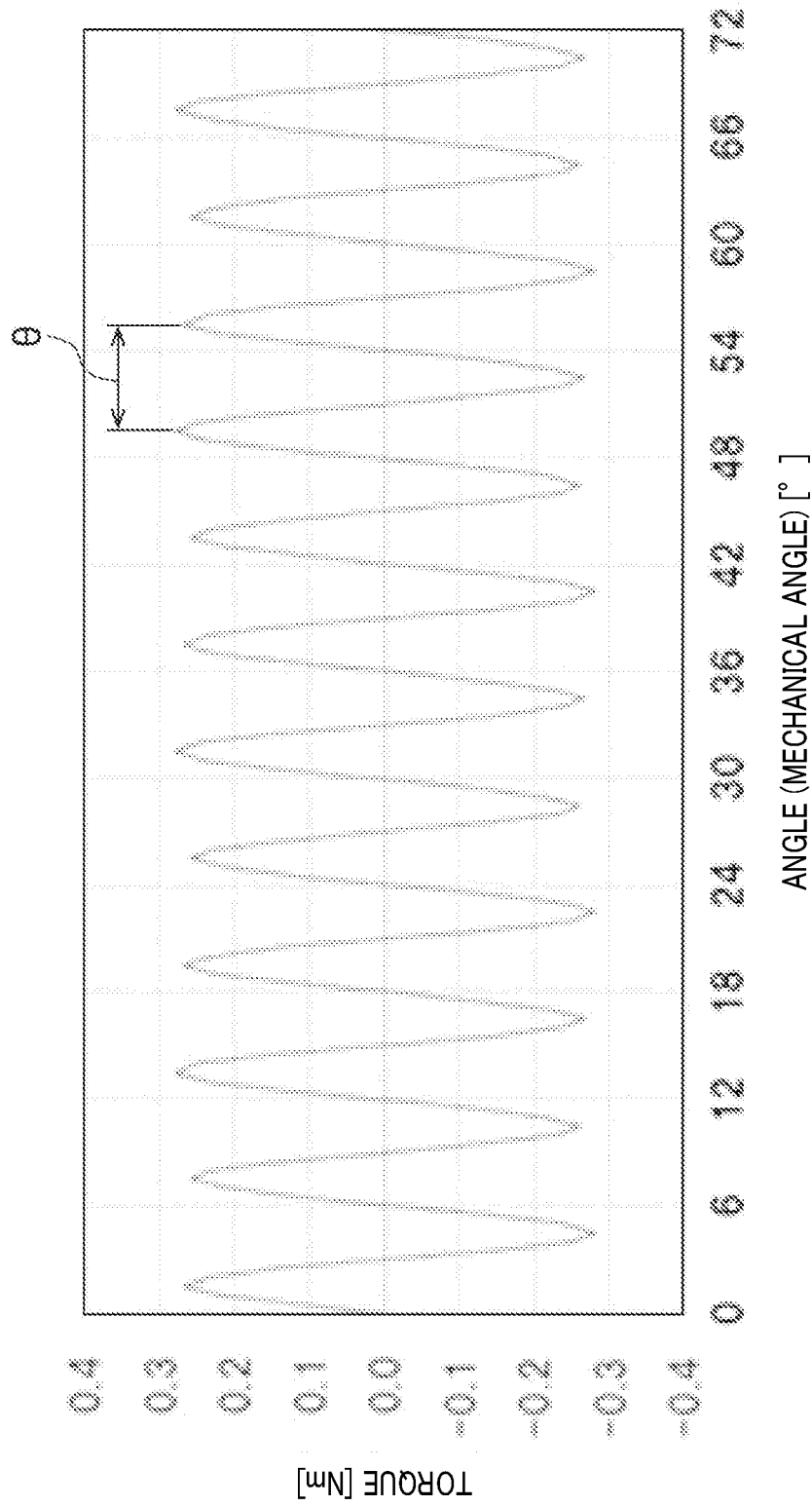
FIG. 17 is another graph showing the waveform of cogging torque of the motor according to the third analytical model, wherein the horizontal axis is enlarged compared to FIG. 16.

As shown in FIGS. 16 and 17, in the motor according to the third analytical model, the peak value P of the cogging torque was about 0.5 Nm and the angle θ between the peaks of the cogging torque was about 6°.

Moreover, though graphs thereof are not shown, in the motor according to the fourth analytical model, the peak value P of the cogging torque was smaller than those in the motors according to the second and third analytical models. Further, in the motor according to the fourth analytical model, the angle θ between the peaks of the cogging torque was smaller than that in the motor according to the second analytical model.

From the above results, it can be concluded that of the 3-phase, 20-pole and 15-slot motors, the motor according to the third analytical model is a motor with which it is possible to achieve the aims of realizing high torque, increasing the peak value P of the cogging torque and reducing the angle θ between the peaks of the cogging torque.

Figure 18:
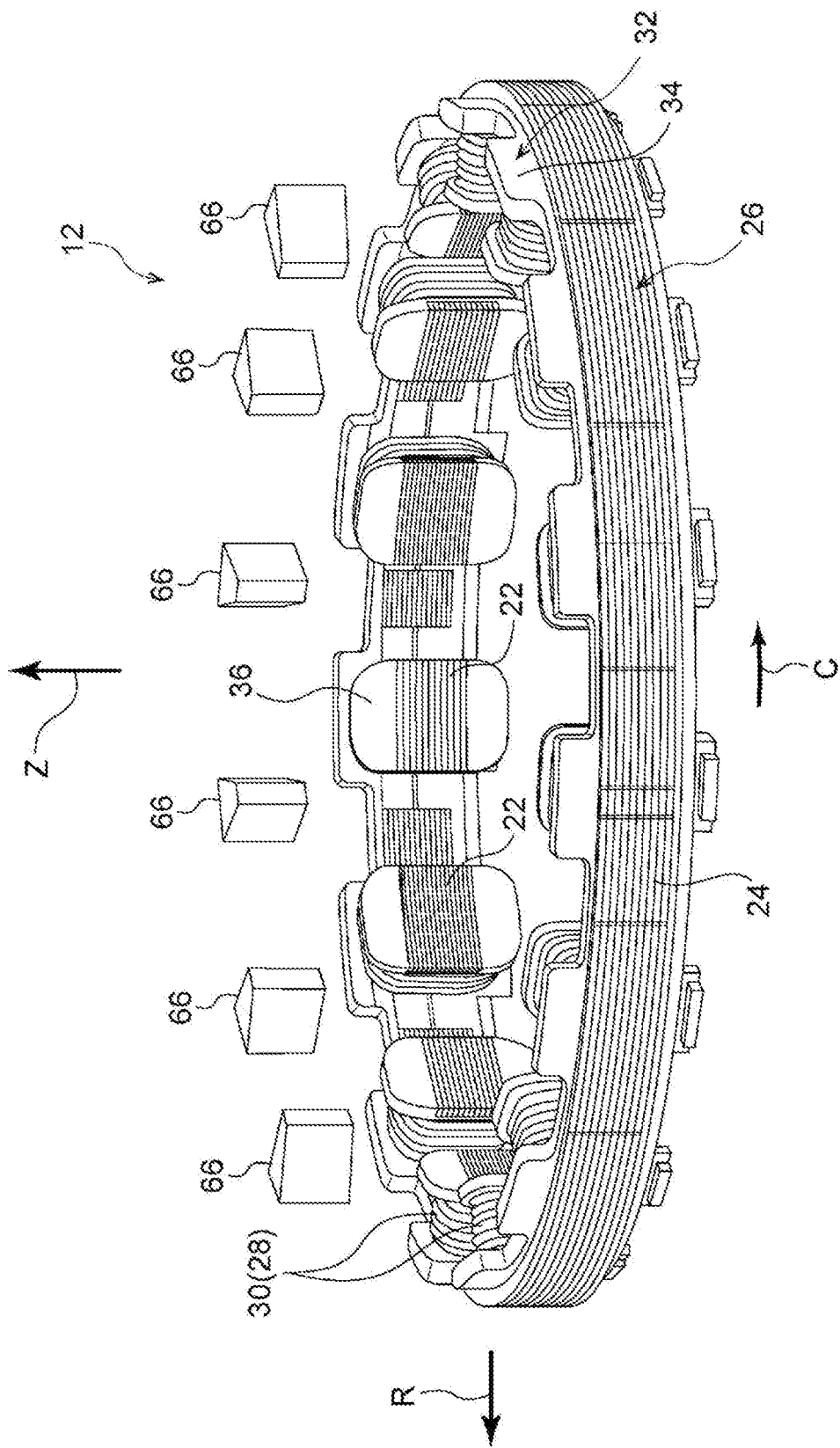
FIG. 18 is a perspective view showing a stator according to a second embodiment, wherein the stator is in a state where pseudo-teeth have not been fixed to a stator core.

Moreover, as shown in FIGS. 1-3, in the present embodiment, the pseudo-teeth 66 are formed integrally with the stator core 26 into one piece. Consequently, it becomes possible to achieve high torque of the motor 10 while suppressing increase in the number of parts constituting the motor 10. In addition, as in a motor according to the second embodiment of the present disclosure as shown in FIG. 18, the pseudo-teeth 66 may be formed separately from the stator core 26. With this configuration, during the process of winding the windings 28 around the winding portions 22A of the teeth 22, it is possible to prevent or suppress the pseudo-teeth 66 from impeding the winding process. Moreover, in this configuration, the pseudo-teeth 66 may be joined to the stator core 26 by press-fitting a part of each of the pseudo-teeth 66 into a part of the stator core 26. As an alternative, the pseudo-teeth 66 may be joined to the stator core 26 by an adhesive or the like. As another alternative, the pseudo-teeth 66 may be joined to the stator core 26 via the insulator 32 or the like. Furthermore, in this configuration, the pseudo-teeth 66 may be formed of a material (e.g., a resin material containing a sintered metal or metal powder) different from the material of the stator core 26.

Moreover, as shown in FIGS. 1-3, in the present embodiment, between each circumferentially-adjacent pair of the teeth 22 having no pseudo-tooth 66 arranged therebetween, there is arranged part of one of the sensors 16, part of one of the circuit-board connection terminals 72 or part of the neutral-point terminals 70. Consequently, by utilizing the spaces between the circumferentially-adjacent teeth 22 where no pseudo-tooth 66 is arranged, it becomes possible to suppress increase in the size of the motor 10. It should be noted that other members of the motor 10 may alternatively be arranged in the spaces between the circumferentially-adjacent teeth 22 where no pseudo-tooth 66 is arranged.

Moreover, as shown in FIGS. 4 and 5 as well as in FIGS. 1-3, in the present embodiment, the sensors 16 and the circuit-board connection terminals 72, which are connected to the circuit board 44, are arranged so as to be concentrated respectively in the two circumferentially-adjacent parts of the stator core 26. Consequently, it becomes possible to connect the sensors 16 and the circuit-board connection terminals 72 to the circuit board 44 without increasing the size of the circuit board 44 in the circumferential direction.

Moreover, in the present embodiment, the sensors 16, the neutral-point terminals 70 and the circuit-board connection terminals 72 are held (or supported) by the busbar 50 that is formed separately from the insulator 32. With this configuration, during the process of winding the windings 28 around the winding portions 22A of the teeth 22, it is possible to prevent or suppress the sensors 16, the neutral-point terminals 70 and the circuit-board connection terminals 72 from impeding the winding process.

Moreover, as shown in FIG. 7, in the present embodiment, the bridging wire 28B (i.e., another portion of the windings 28) connecting one of the coils 30 and another of the coils 30 is extended (or routed) along one of the pseudo-teeth 66 via the corresponding pseudo-tooth covering portion 68 of the insulator 32. With this configuration, it becomes possible to shorten the length of the bridging wire 28A extended (or routed) along the outer peripheral part of the back-core covering portion 34 of the insulator 32 on the other side in the axial direction.

Third Embodiment

Next, a motor 74 according to the third embodiment of the present disclosure will be described with reference to FIG. 19A. It should be noted that in the motor 74 according to the third embodiment, members and portions corresponding to those in the motor 10 according to the first embodiment are designated by the same reference numerals as the corresponding members and portions in the motor 10 and explanation thereof will be omitted hereinafter.

Figure 19A:
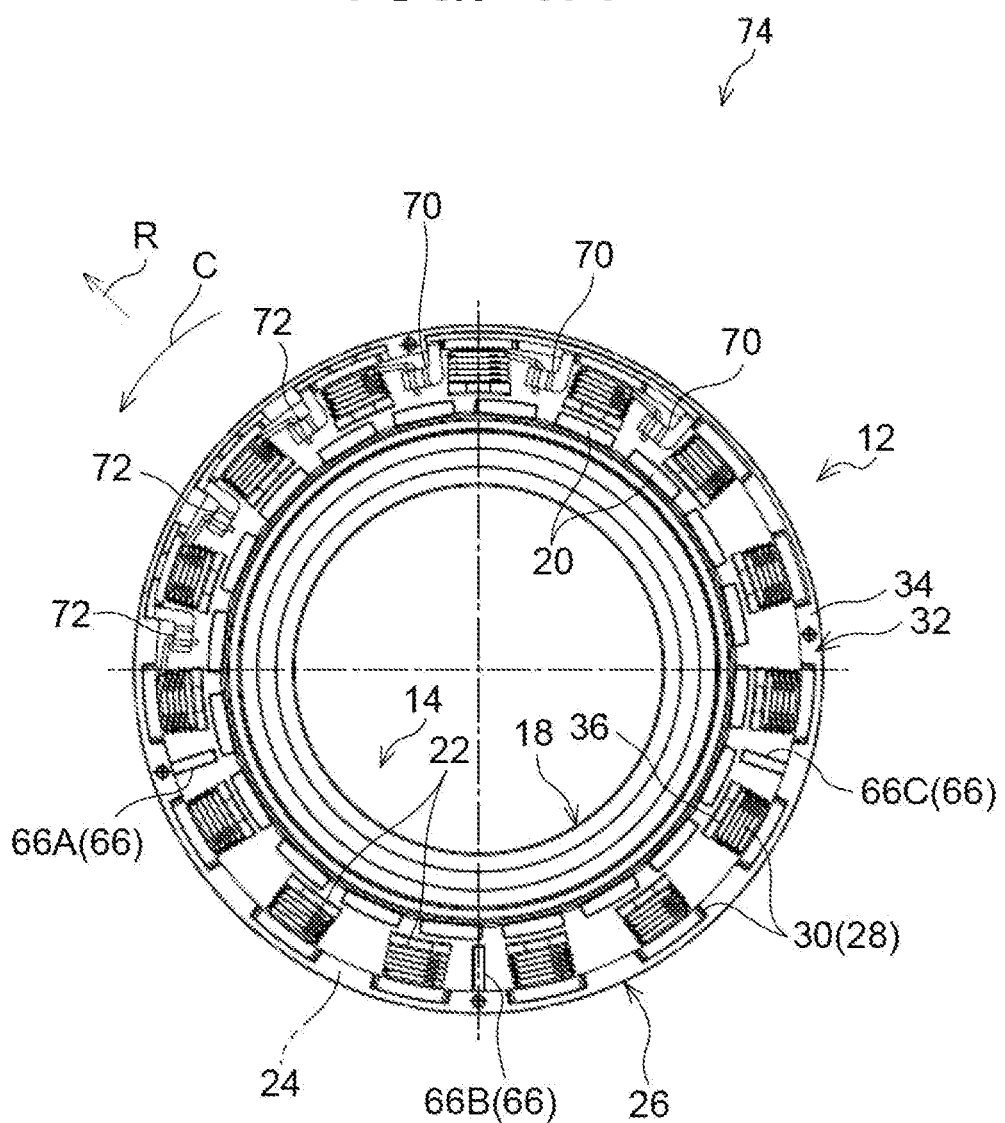
FIG. 19A is a plan view showing a stator and a rotor that constitute a motor according to a third embodiment.

As shown in FIG. 19A, the motor 74 according to the present embodiment is a 3-phase, 20-pole and 15-slot motor. In the motor 74, there are provided three pseudo-teeth 66 each of which is located in a circumferentially central area between a circumferentially-adjacent pair of the teeth 22. Further, the three pseudo-teeth 66 are arranged respectively at positions where the electrical angle of the motor 74 is 720° (360°×integer multiple). In addition, the three pseudo-teeth 66 will be sequentially referred to as the first pseudo-tooth 66A, the second pseudo-tooth 66B and the third pseudo-tooth 66C from one side to the other in the circumferential direction. Moreover, the circumferential width of the pseudo-teeth 66 of the motor 74 according to the present embodiment is set to be smaller than that of the pseudo-teeth 66 of the motor 10 according to the first embodiment. Furthermore, each of the pseudo-teeth 66 is formed in a rectangular solid shape with the circumferential width thereof set to be constant in the radial direction.

Since the motor 74 according to the present embodiment has 20 magnetic poles, the mechanical angle corresponding to the electrical angle 360° is 36°. On the other hand, the circumferential interval between each circumferentially-adjacent pair of the teeth 22 is 24°. Therefore, it is impossible to set the circumferential interval between the first pseudo-tooth 66A and the second pseudo-tooth 66B to 36° and to set the circumferential interval between the second pseudo-tooth 66B and the third pseudo-tooth 66C to 36°. Hence, both the circumferential interval between the first pseudo-tooth 66A and the second pseudo-tooth 66B and the circumferential interval between the second pseudo-tooth 66B and the third pseudo-tooth 66C are set to 72° that is the least common multiple of the mechanical angle 36° corresponding to the electrical angle 360° and the circumferential interval 24° between each circumferentially-adjacent pair of the teeth 22.

In the present embodiment described above, by providing the first pseudo-tooth 66A, the second pseudo-tooth 66B and the third pseudo-tooth 66C in the motor 74 and arranging them at the above-described positions, it becomes possible to increase the cogging torque of the motor 74 in comparison with the case of providing no pseudo-tooth 66 therein.

Figure 19B:
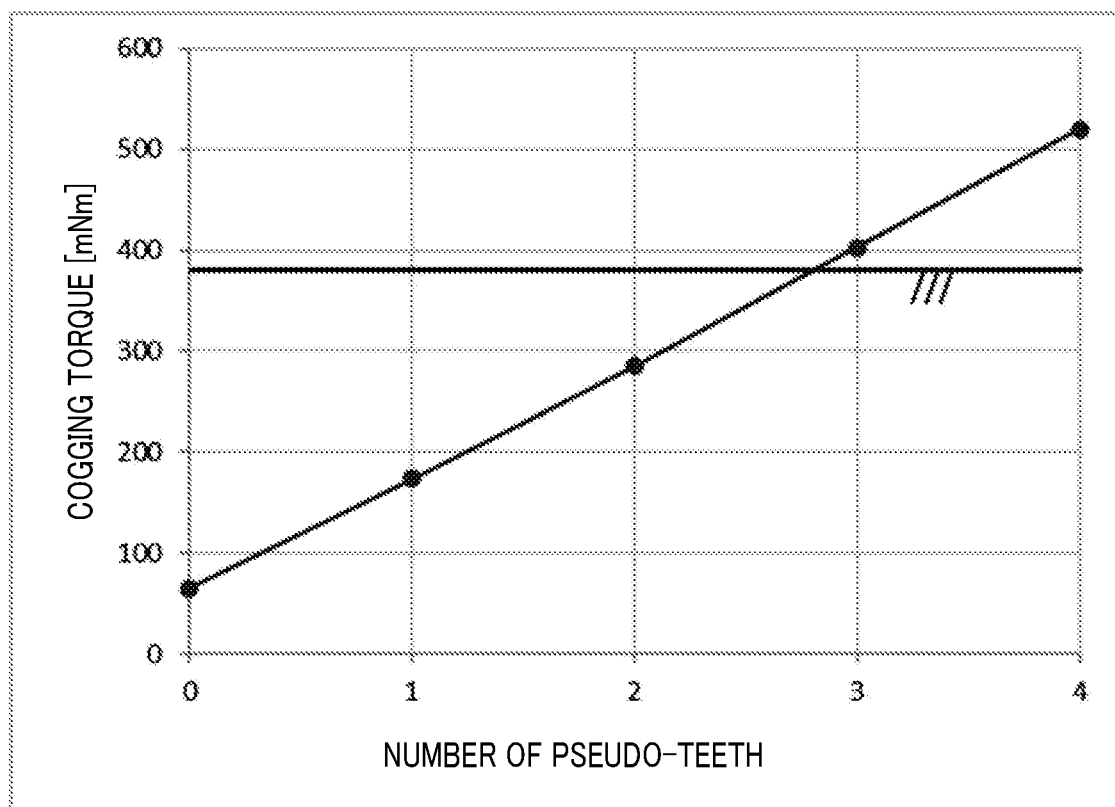
FIG. 19B is a graph illustrating the relationship between the number of pseudo-teeth and the value of cogging torque.

In FIG. 19B, there is shown a graph in which the horizontal axis represents the number of the pseudo-teeth 66 and the vertical axis represents the value of the cogging torque. As shown in this figure, the cogging torque is about 70 mNm when the number of the pseudo-teeth 66 is 0. Moreover, the cogging torque is about 180 mNm when the number of the pseudo-teeth 66 is 1 and about 290 mNm when the number of the pseudo-teeth 66 is 2. Furthermore, the cogging torque is about 400 mNm when the number of the pseudo-teeth 66 is 3 and about 520 mNm when the number of the pseudo-teeth 66 is 4. Therefore, in the case of the desired value of the cogging torque being larger than or equal to 380 mNm, it is possible to obtain the desired cogging torque by setting the number of the pseudo-teeth 66 to 3 as in the motor 74 according to the present embodiment.

Fourth Embodiment

Next, a motor 76 according to the fourth embodiment of the present disclosure will be described with reference to FIG. 20. It should be noted that in the motor 76 according to the fourth embodiment, members and portions corresponding to those in the motor 74 according to the third embodiment are designated by the same reference numerals as the corresponding members and portions in the motor 74 and explanation thereof will be omitted hereinafter.

Figure 20:
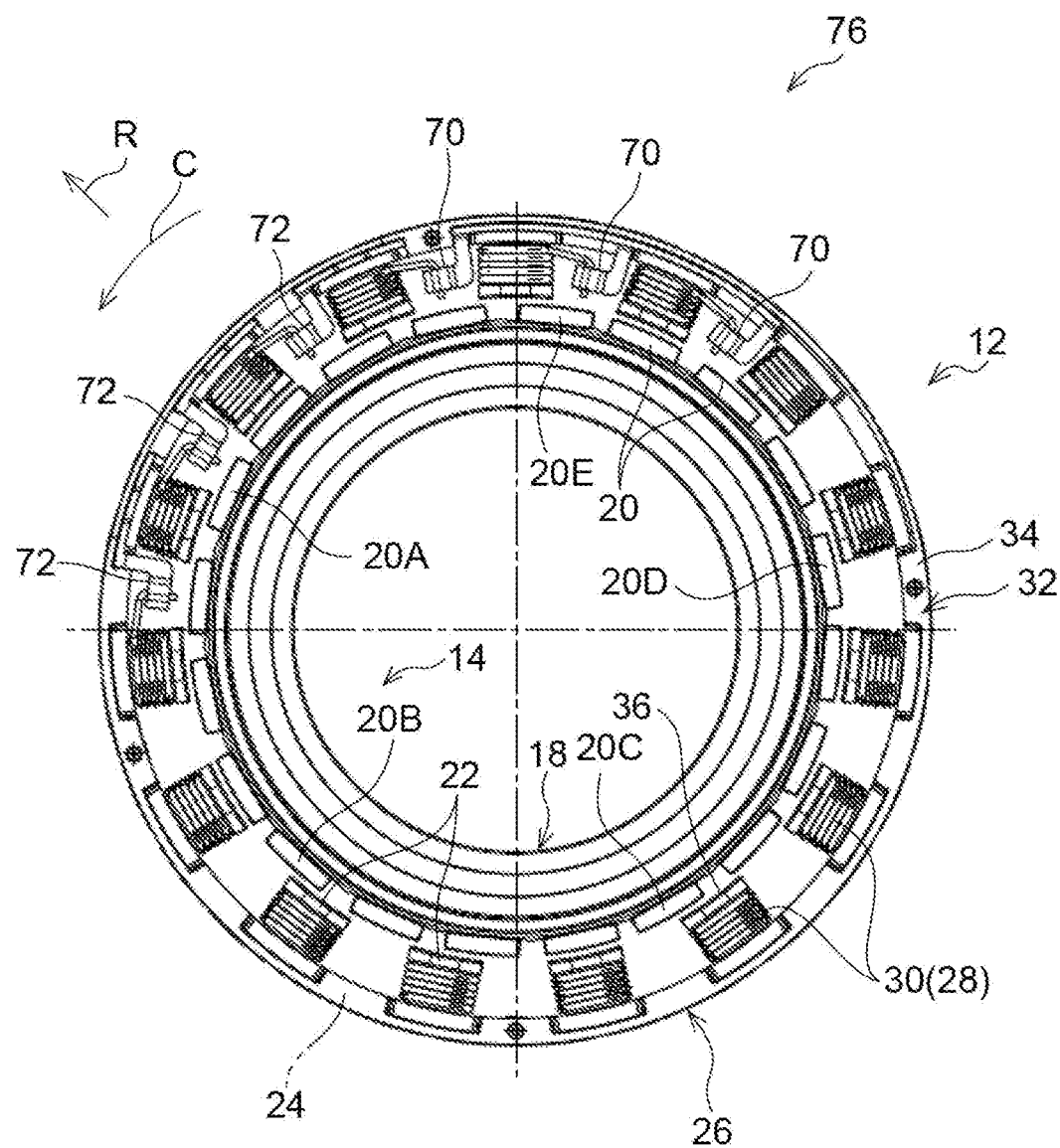
FIG. 20 is a plan view showing a stator and a rotor that constitute a motor according to a fourth embodiment.

As shown in FIG. 20, the motor 76 according to the present embodiment is a 3-phase, 20-pole and 15-slot motor. The motor 76 does not include pseudo-teeth 66 as included in the motor 74 according to the third embodiment. On the other hand, in the motor 76 according to the present embodiment, of the twenty magnets 20, five magnets 20A, 20B, 20C, 20D and 20E, which are arranged at positions where the electrical angle is 720° (360°×integer multiple), have the positions of magnetic-pole centers thereof offset to the other side in the circumferential direction with respect to the positions where the electrical angle is 720° (360°×integer multiple). More specifically, of the twenty magnets 20, the five magnets 20A, 20B, 20C, 20D and 20E, which are arranged at intervals of 72° in mechanical angle in the circumferential direction, have the positions of the magnetic-pole centers thereof offset, for example by 0.3 mm, to the opposite side to the direction of the arrow C with respect to the positions in the case of the twenty magnets 20 being arranged at equal intervals in the circumferential direction.

In the present embodiment described above, of the twenty magnets 20, the five magnets 20A, 20B, 20C, 20D and 20E have the positions of the magnetic-pole centers thereof offset as described above. Consequently, it becomes possible to increase the cogging torque of the motor 76 in comparison with the case of the twenty magnets 20 being arranged at equal intervals in the circumferential direction.

Fifth Embodiment

Next, a motor 78 according to the fifth embodiment of the present disclosure will be described with reference to FIGS. 21 and 22. It should be noted that in the motor 78 according to the fifth embodiment, members and portions corresponding to those in the motors 74 and 76 according to the third and fourth embodiments are designated by the same reference numerals as the corresponding members and portions in the motors 74 and 76 and explanation thereof will be omitted hereinafter.

Figure 21:
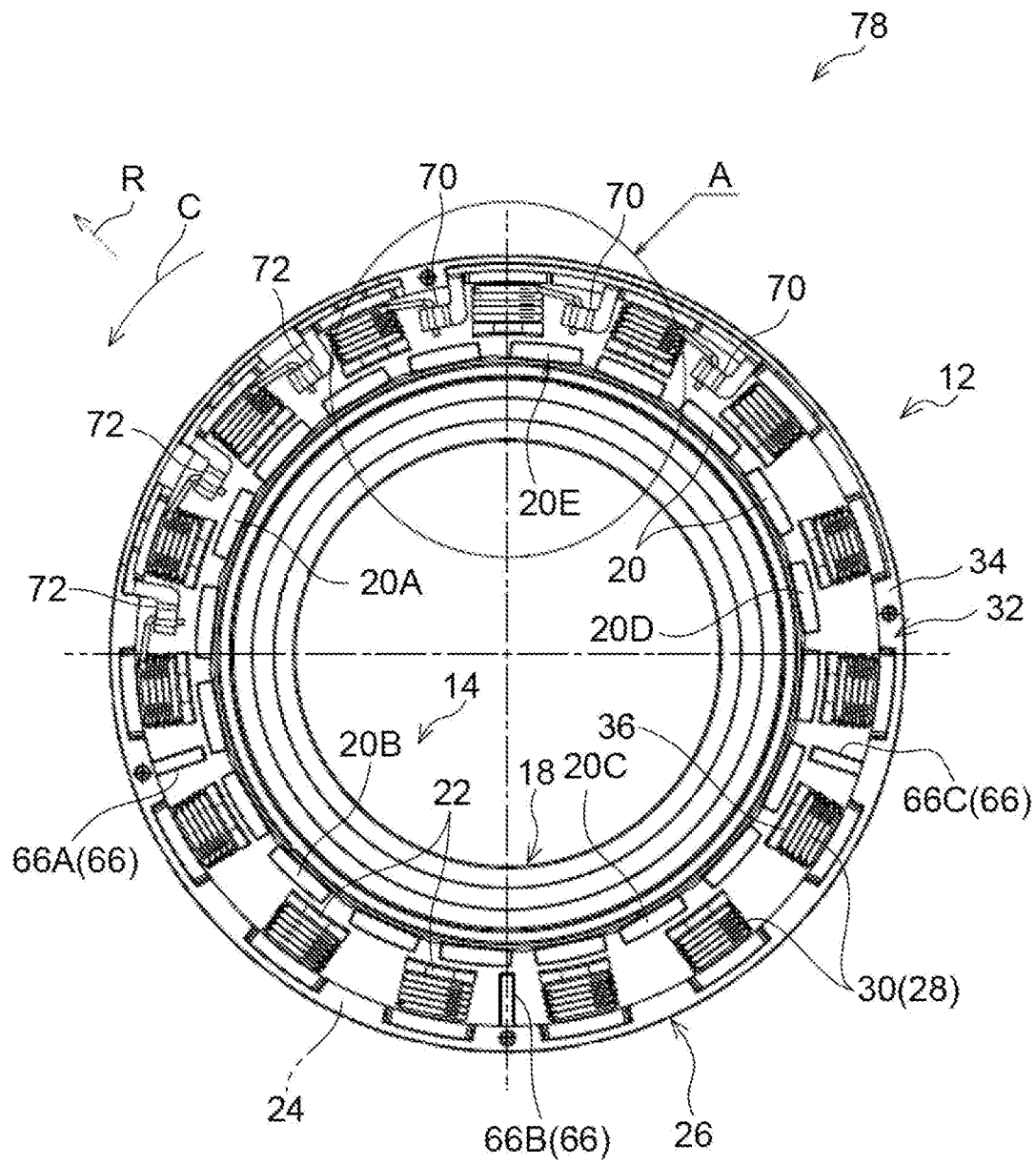
FIG. 21 is a plan view showing a stator and a rotor that constitute a motor according to a fifth embodiment.
Figure 22:
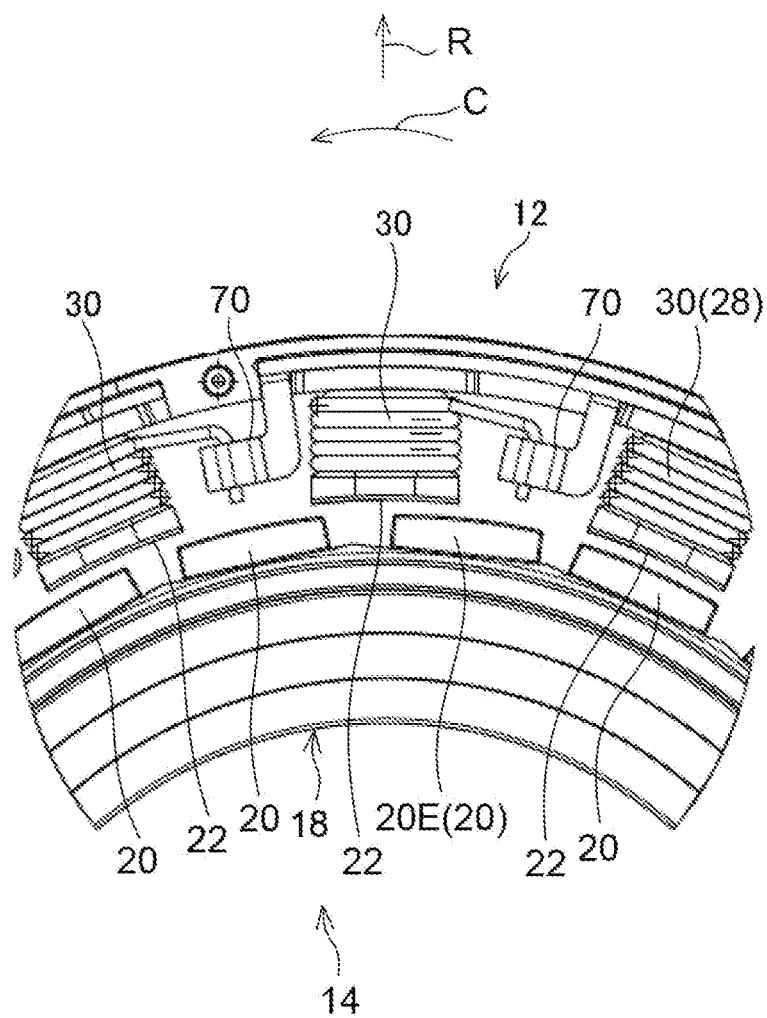
FIG. 22 is an enlarged plan view showing, through enlargement, that part of FIG. 21 which is enclosed by the line indicated by the arrow A.

As shown in FIGS. 21 and 22, both the configuration of the motor 74 according to the third embodiment and the configuration of the motor 76 according to the fourth embodiment are applied to the motor 78 of the present embodiment. That is, the motor 78 according to the present embodiment includes a first pseudo-tooth 66A, a second pseudo-tooth 66B and a third pseudo-tooth 66C. Moreover, in the motor 78 according to the present embodiment, of the twenty magnets 20, five magnets 20A, 20B, 20C, 20D and 20E, which are arranged at intervals of 72° in mechanical angle in the circumferential direction, have the positions of magnetic-pole centers thereof offset to the opposite side to the direction of the arrow C with respect to the positions in the case of the twenty magnets 20 being arranged at equal intervals in the circumferential direction.

In the present embodiment described above, it becomes possible to further increase the cogging torque of the motor 78 in comparison with both the motor 74 according to the third embodiment and the motor 76 according to the fourth embodiment.

Sixth Embodiment, Seventh Embodiment and Eighth Embodiment

Next, a motor 80 according to the sixth embodiment, a motor 82 according to the seventh embodiment and a motor 84 according to the eighth embodiment of the present disclosure will be described with reference to FIGS. 23-25. It should be noted that in the motors 80, 82 and 84 according to the sixth, seventh and eighth embodiments, members and portions corresponding to those in the motor 74 according to the third embodiment are designated by the same reference numerals as the corresponding members and portions in the motor 74 and explanation thereof will be omitted hereinafter.

Figure 23:
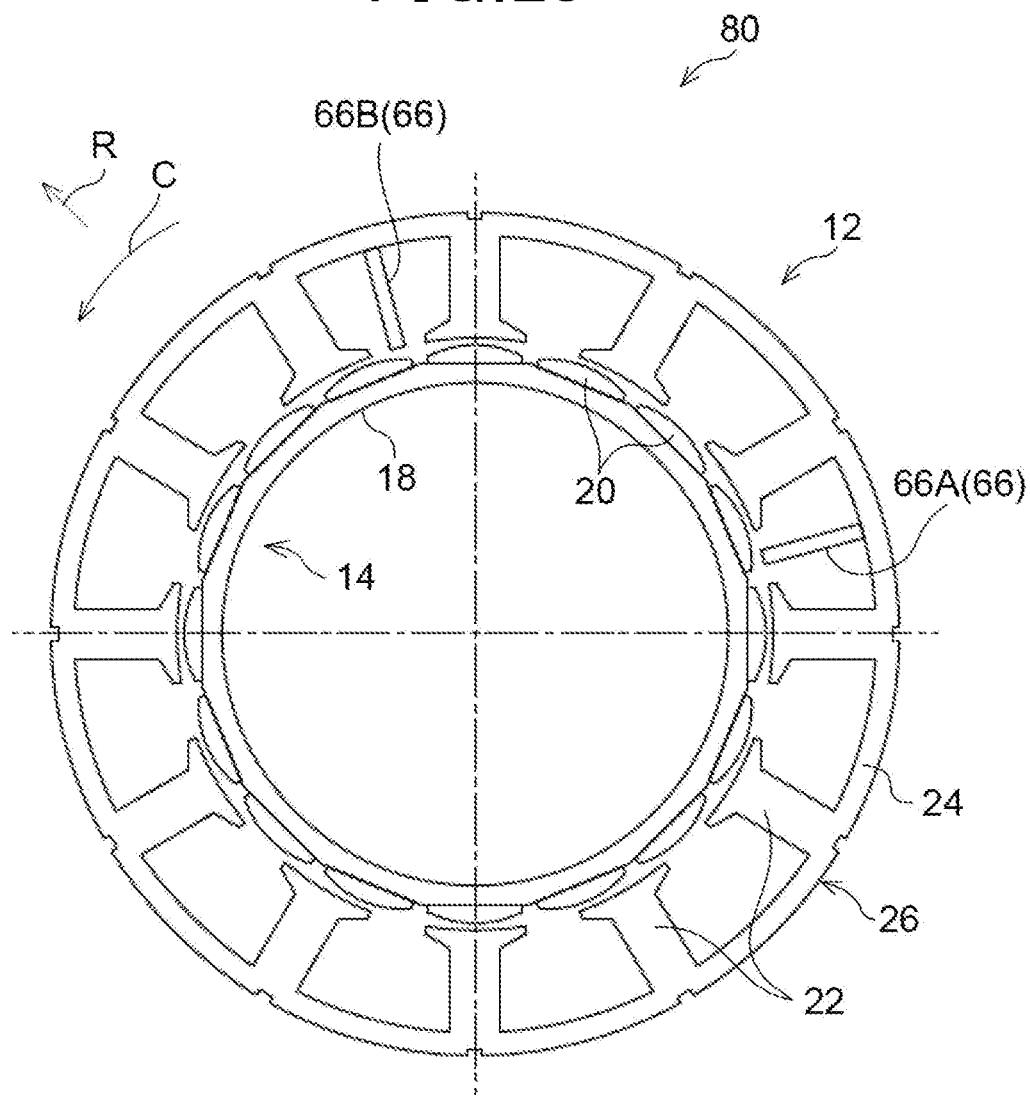
FIG. 23 is a plan view showing a stator and a rotor that constitute a motor according to a sixth embodiment.

As shown in FIG. 23, the motor 80 according to the sixth embodiment is a 3-phase, 16-pole and 12-slot motor which is a 4-pole 3-slot series motor. In this motor 80, there are provided two pseudo-teeth 66 each of which is located in a circumferentially central area between a circumferentially-adjacent pair of the teeth 22. Since the motor 80 according to the sixth embodiment has 16 magnetic poles, the mechanical angle corresponding to the electrical angle 360° is 45°. On the other hand, the circumferential interval between each circumferentially-adjacent pair of the teeth 22 is 30°. Therefore, it is impossible to set the circumferential interval between the first pseudo-tooth 66A and the second pseudo-tooth 66B to 45°. Hence, the circumferential interval between the first pseudo-tooth 66A and the second pseudo-tooth 66B is set to 90° that is the least common multiple of the mechanical angle 45° corresponding to the electrical angle 360° and the circumferential interval 30° between each circumferentially-adjacent pair of the teeth 22.

In the sixth embodiment described above, by providing the first pseudo-tooth 66A and the second pseudo-tooth 66B in the motor 80 and arranging them at the above-described positions, it becomes possible to increase the cogging torque of the motor 80 in comparison with the case of providing no pseudo-tooth 66 therein.

Figure 24:
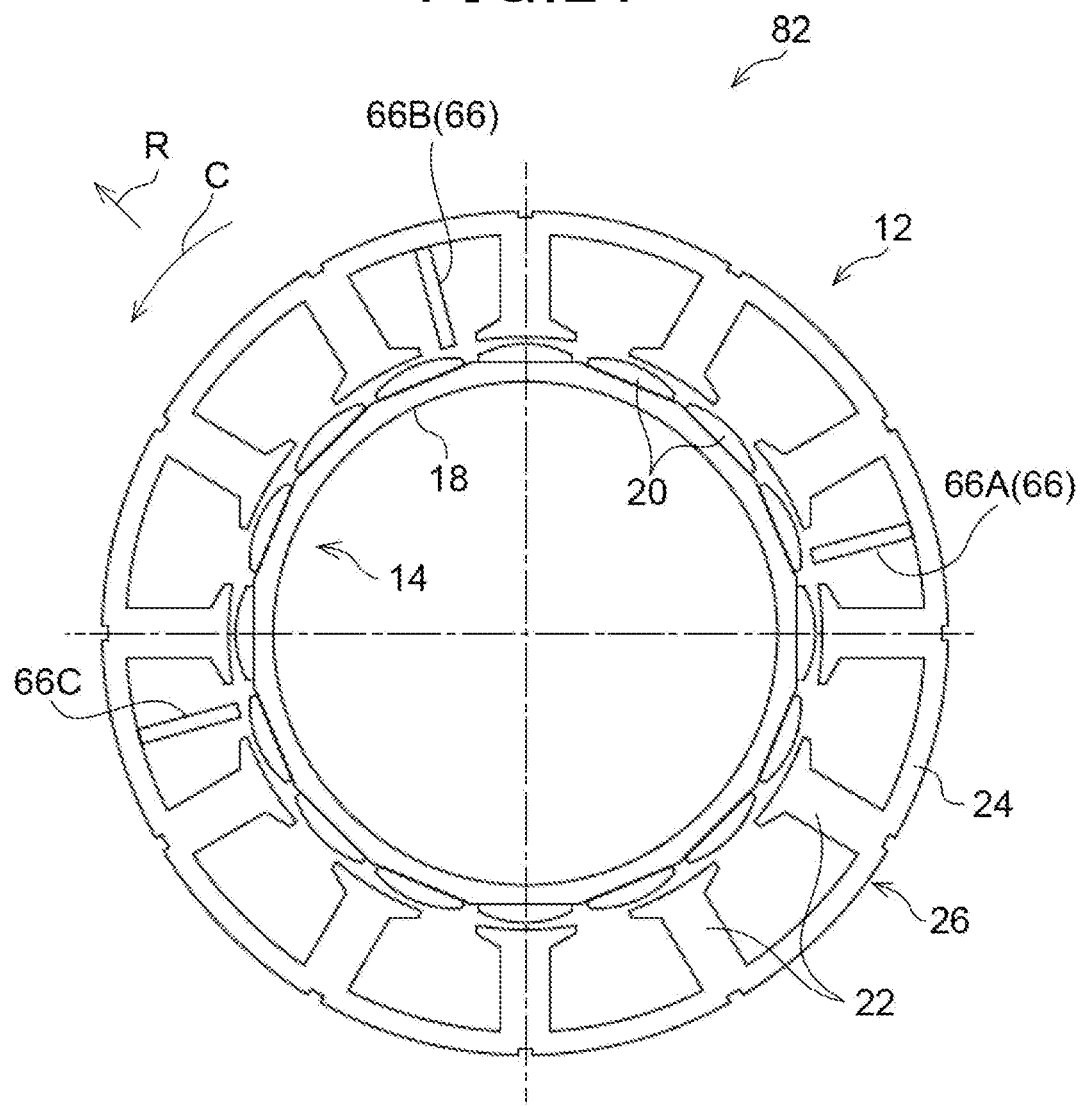
FIG. 24 is a plan view showing a stator and a rotor that constitute a motor according to a seventh embodiment.
Figure 25:
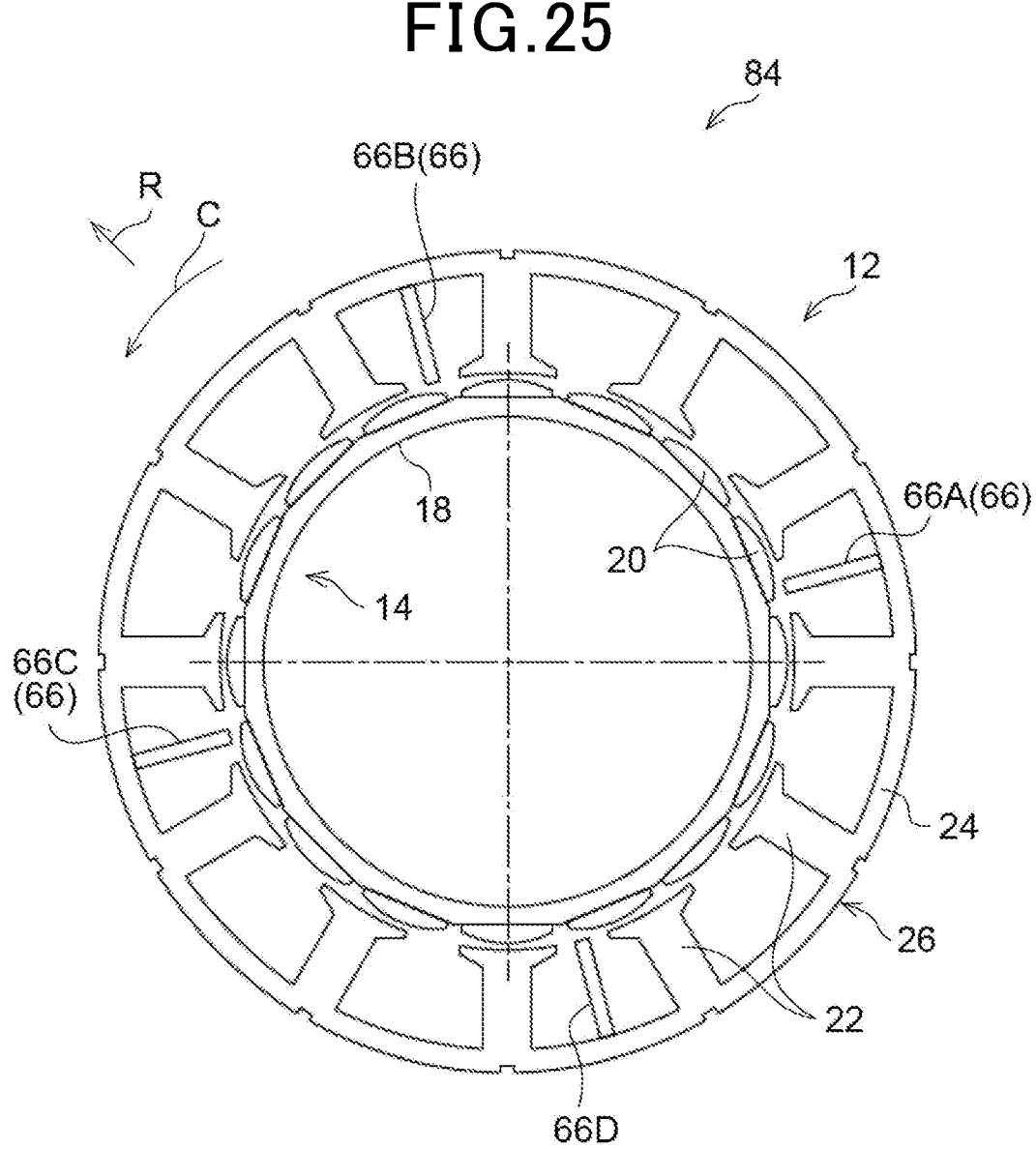
FIG. 25 is a plan view showing a stator and a rotor that constitute a motor according to an eighth embodiment.

As shown in FIG. 24, the motor 82 according to the seventh embodiment further includes a third pseudo-tooth 66C in addition to the configuration of the motor 80 according to the sixth embodiment. Moreover, as shown in FIG. 25, the motor 84 according to the eighth embodiment further includes a fourth pseudo-tooth 66D in addition to the configuration of the motor 82 according to the seventh embodiment. The circumferential interval between the second pseudo-tooth 66B and the third pseudo-tooth 66C is set to 90°. The circumferential interval between the third pseudo-tooth 66C and the fourth pseudo-tooth 66D is also set to 90°.

In the seventh embodiment described above, by providing the first to the third pseudo-teeth 66A-66C in the motor 82 and arranging them at the above-described positions, it becomes possible to further increase the cogging torque of the motor 82 in comparison with the motor 80 according to the sixth embodiment. Moreover, in the eighth embodiment described above, by providing the first to the fourth pseudo-teeth 66A-66D in the motor 84 and arranging them at the above-described positions, it becomes possible to further increase the cogging torque of the motor 84 in comparison with the motor 82 according to the seventh embodiment.

Ninth Embodiment, Tenth Embodiment and Eleventh Embodiment

Next, a motor 86 according to the ninth embodiment, a motor 88 according to the tenth embodiment and a motor 90 according to the eleventh embodiment will be described with reference to FIGS. 26-28. It should be noted that in the motors 86, 88 and 90 according to the ninth, tenth and eleventh embodiments, members and portions corresponding to those in the motor 80 according to the sixth embodiment are designated by the same reference numerals as the corresponding members and portions in the motor 80 and explanation thereof will be omitted hereinafter.

Figure 26:
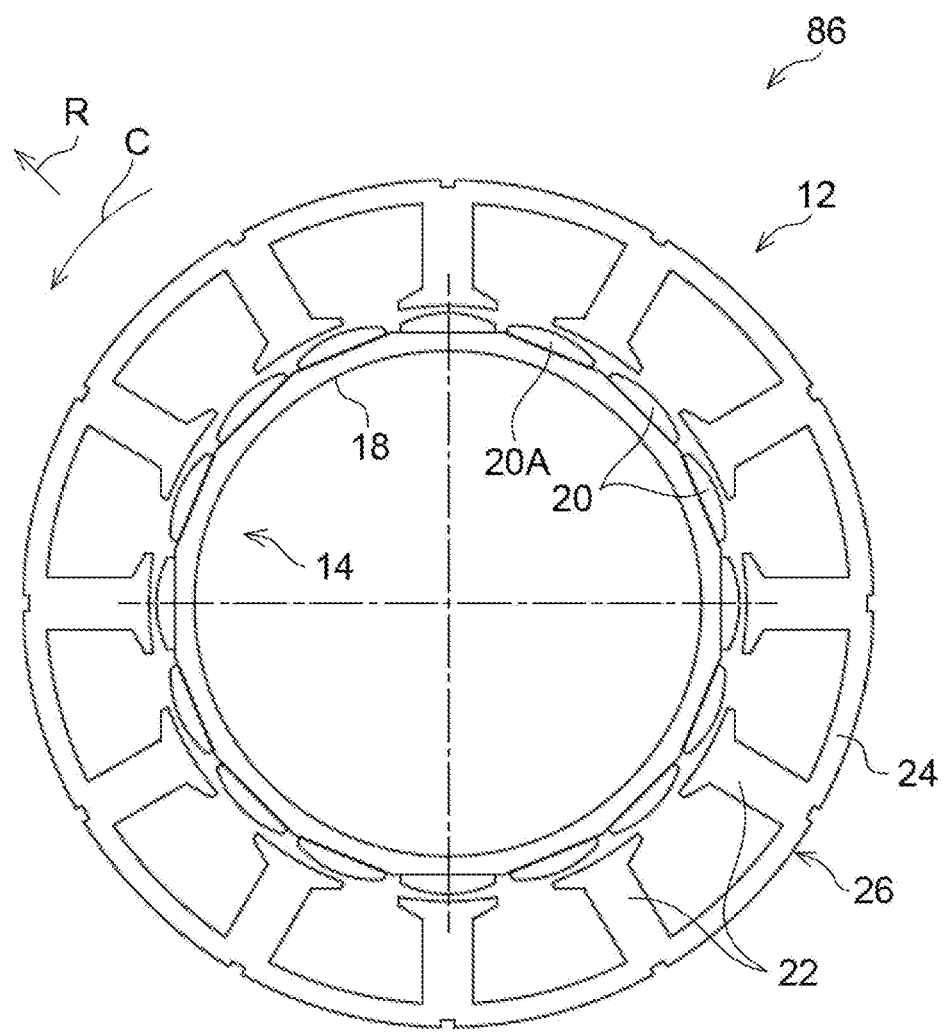
FIG. 26 is a plan view showing a stator and a rotor that constitute a motor according to a ninth embodiment.

As shown in FIG. 26, the motor 86 according to the ninth embodiment is a 3-phase, 16-pole and 12-slot motor which is a 4-pole 3-slot series motor. The motor 86 does not include pseudo-teeth 66 as included in the motor 80 according to the sixth embodiment. On the other hand, in the motor 86 according to the ninth embodiment, of the sixteen magnets 20, one magnet 20A, which is arranged at a position where the electrical angle is 360°, has the position of a magnetic-pole center thereof offset to the one side in the circumferential direction with respect to the position where the electrical angle is 360°. More specifically, the position of the magnetic-pole center of the one magnet 20A of the sixteen magnets 20 is offset to the opposite side to the direction of the arrow C with respect to the position in the case of the sixteen magnets 20 being arranged at equal intervals in the circumferential direction.

In the ninth embodiment described above, the position of the magnetic-pole center of the one magnet 20A of the sixteen magnets 20 is offset as described above. Consequently, it becomes possible to increase the cogging torque of the motor 86 in comparison with the case of the sixteen magnets 20 being arranged at equal intervals in the circumferential direction.

Figure 27:
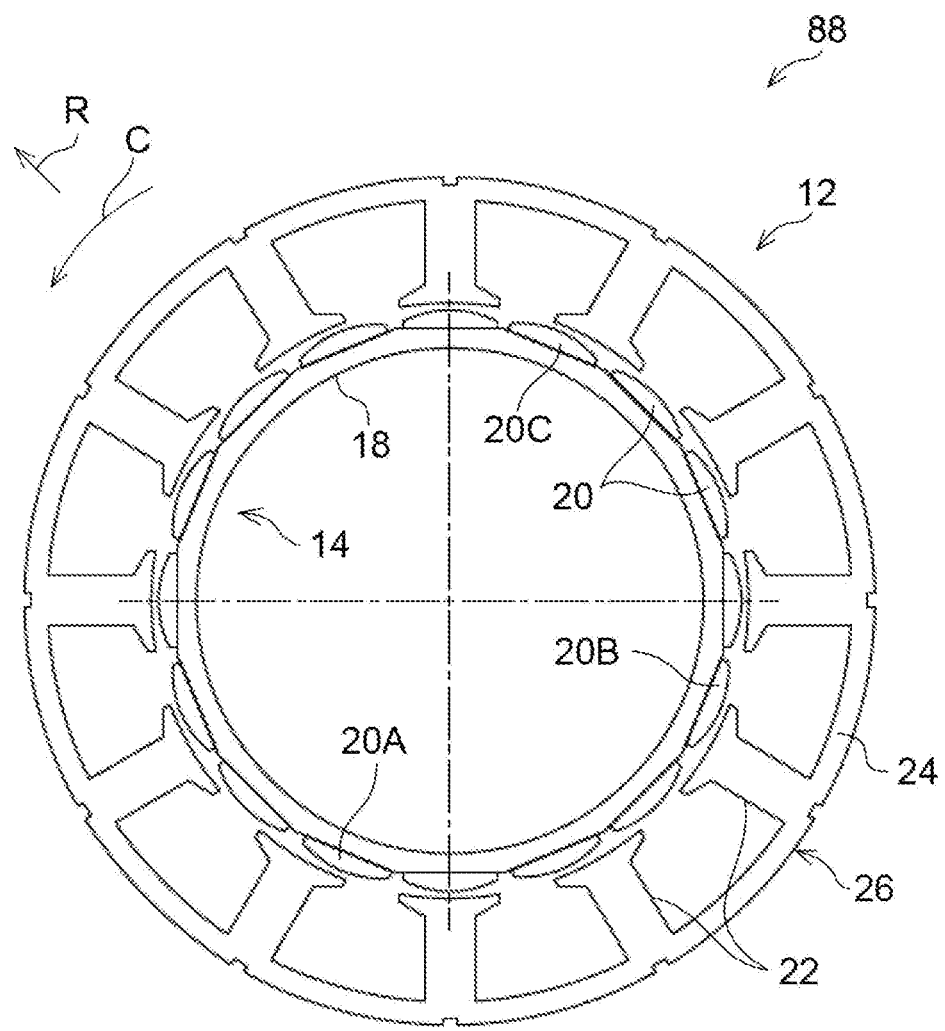
FIG. 27 is a plan view showing a stator and a rotor that constitute a motor according to a tenth embodiment.

As shown in FIG. 27, in the motor 88 according to the tenth embodiment, of the sixteen magnets 20, three magnets 20A, 20B and 20C, which are arranged at positions where the electrical angle is 720° (360°×integer multiple), have the positions of magnetic-pole centers thereof offset to the one side in the circumferential direction with respect to the positions where the electrical angle is 720° (360°×integer multiple). More specifically, of the sixteen magnets 20, the three magnets 20A, 20B and 20C, which are arranged at intervals of 90° in mechanical angle in the circumferential direction, have the positions of the magnetic-pole centers thereof offset, by the same distance (or circumferential angle), to the one side in the circumferential direction with respect to the positions in the case of the sixteen magnets 20 being arranged at equal intervals in the circumferential direction.

In the tenth embodiment described above, it becomes possible to further increase the cogging torque of the motor 88 in comparison with the motor 86 according to the ninth embodiment.

Figure 28:
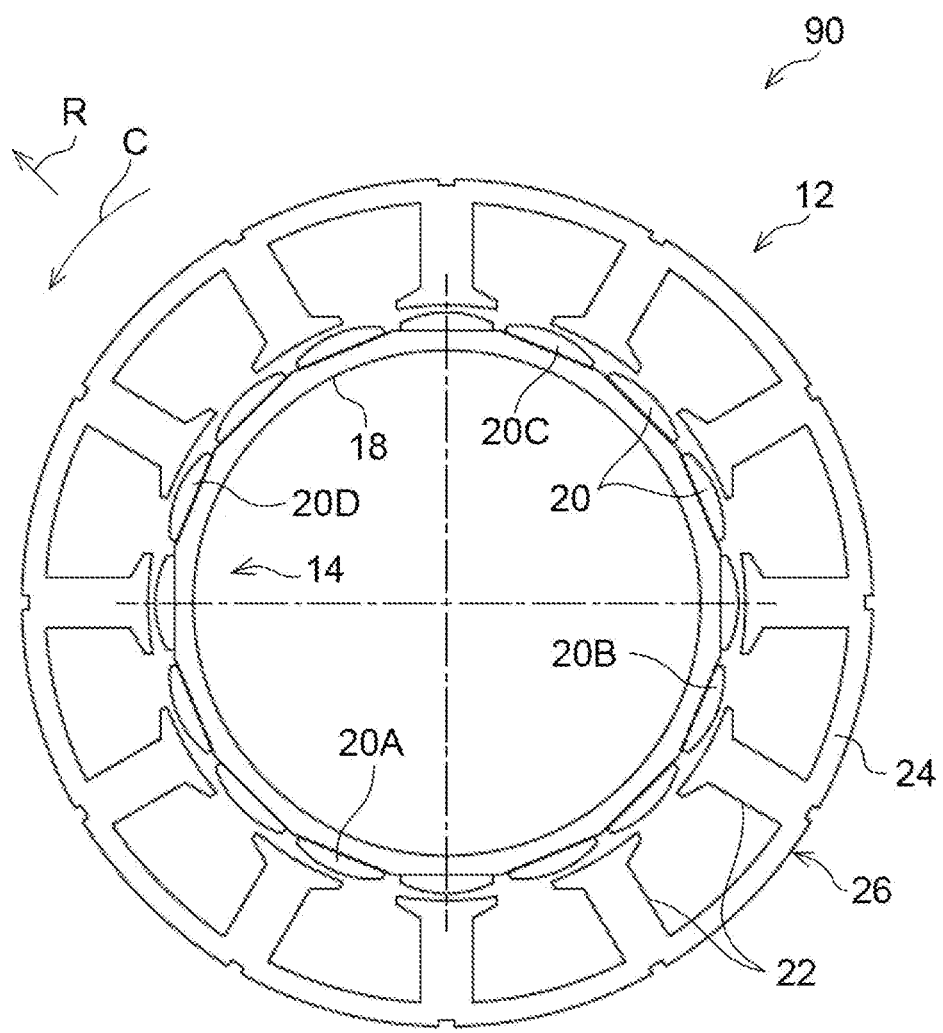
FIG. 28 is a plan view showing a stator and a rotor that constitute a motor according to an eleventh embodiment.

As shown in FIG. 28, in the motor 90 according to the eleventh embodiment, of the sixteen magnets 20, four magnets 20A, 20B, 20C and 20D, which are arranged at positions where the electrical angle is 720° (360°×integer multiple), have the positions of magnetic-pole centers thereof offset to the one side in the circumferential direction with respect to the positions where the electrical angle is 720° (360°×integer multiple). More specifically, of the sixteen magnets 20, the four magnets 20A, 20B, 20C and 20D, which are arranged at intervals of 90° in mechanical angle in the circumferential direction, have the positions of the magnetic-pole centers thereof offset, by the same distance (or circumferential angle), to the one side in the circumferential direction with respect to the positions in the case of the sixteen magnets 20 being arranged at equal intervals in the circumferential direction.

In the eleventh embodiment described above, it becomes possible to further increase the cogging torque of the motor 90 in comparison with the motor 88 according to the tenth embodiment.

Twelfth Embodiment and Thirteenth Embodiment

Next, a motor 92 according to the twelfth embodiment and a motor 94 according to the thirteenth embodiment will be described with reference to FIGS. 29 and 30. It should be noted that in the motors 92 and 94 according to the twelfth and thirteenth embodiments, members and portions corresponding to those in the motors 82, 84, 88 and 90 according to the seventh, eighth, tenth and eleventh embodiments are designated by the same reference numerals as the corresponding members and portions in the motors 82, 84, 88 and 90 and explanation thereof will be omitted hereinafter.

Figure 29:
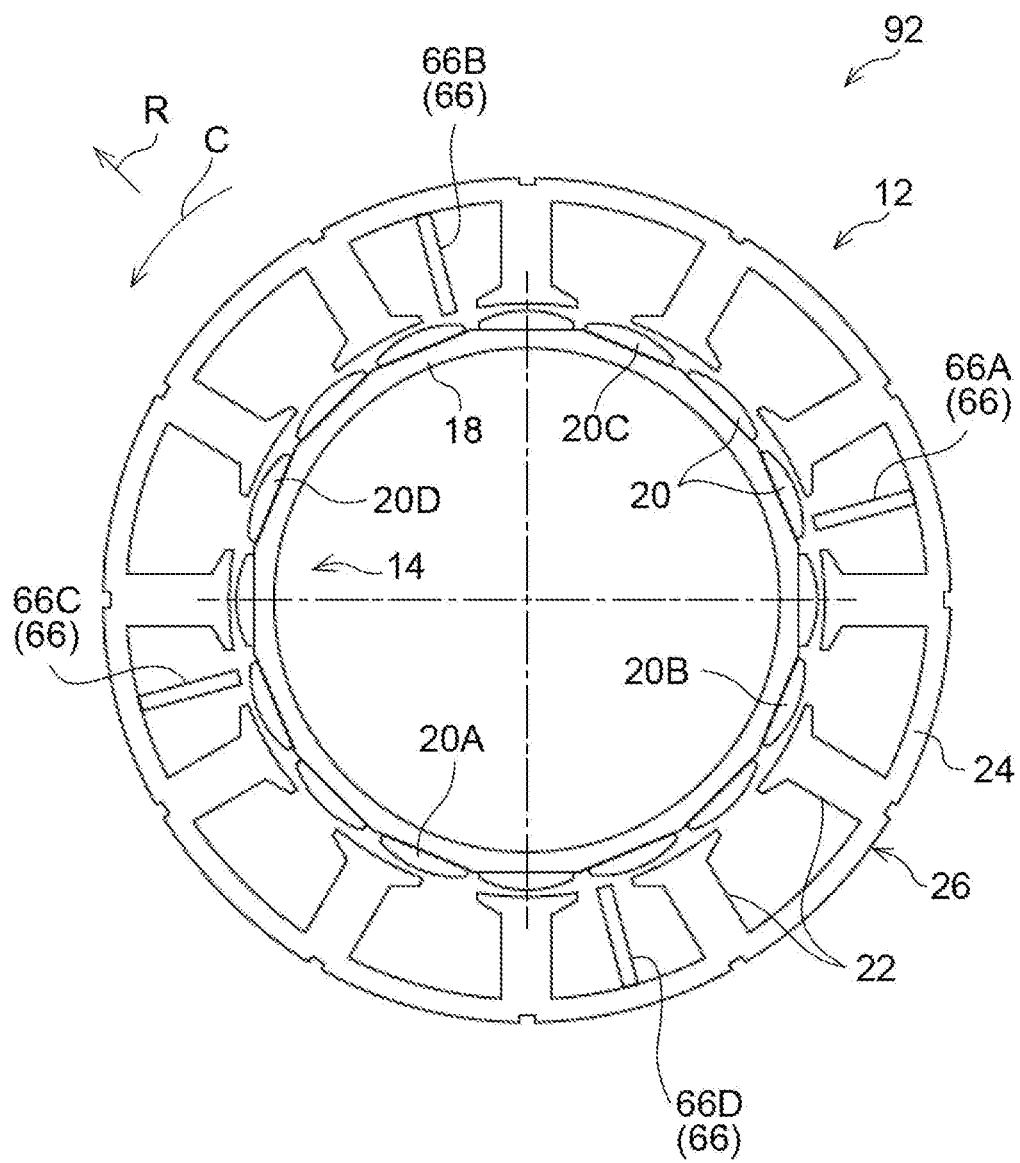
FIG. 29 is a plan view showing a stator and a rotor that constitute a motor according to a twelfth embodiment.

As shown in FIG. 29, the motor 92 according to the twelfth embodiment has a configuration that is a combination of the configuration of the motor 84 according to the eighth embodiment and the configuration of the motor 90 according to the eleventh embodiment. That is, the motor 92 according to the twelfth embodiment includes a first pseudo-tooth 66A, a second pseudo-tooth 66B, a third pseudo-tooth 66C and a fourth pseudo-tooth 66D. Moreover, in the motor 92 according to the twelfth embodiment, of the sixteen magnets 20, four magnets 20A, 20B, 20C and 20D, which are arranged at intervals of 90° in mechanical angle in the circumferential direction, have the positions of magnetic-pole centers thereof offset to the one side in the circumferential direction with respect to the positions in the case of the sixteen magnets 20 being arranged at equal intervals in the circumferential direction.

In the twelfth embodiment described above, it becomes possible to further increase the cogging torque of the motor 92 in comparison with both the motor 84 according to the eighth embodiment and the motor 90 according to the eleventh embodiment.

Figure 30:
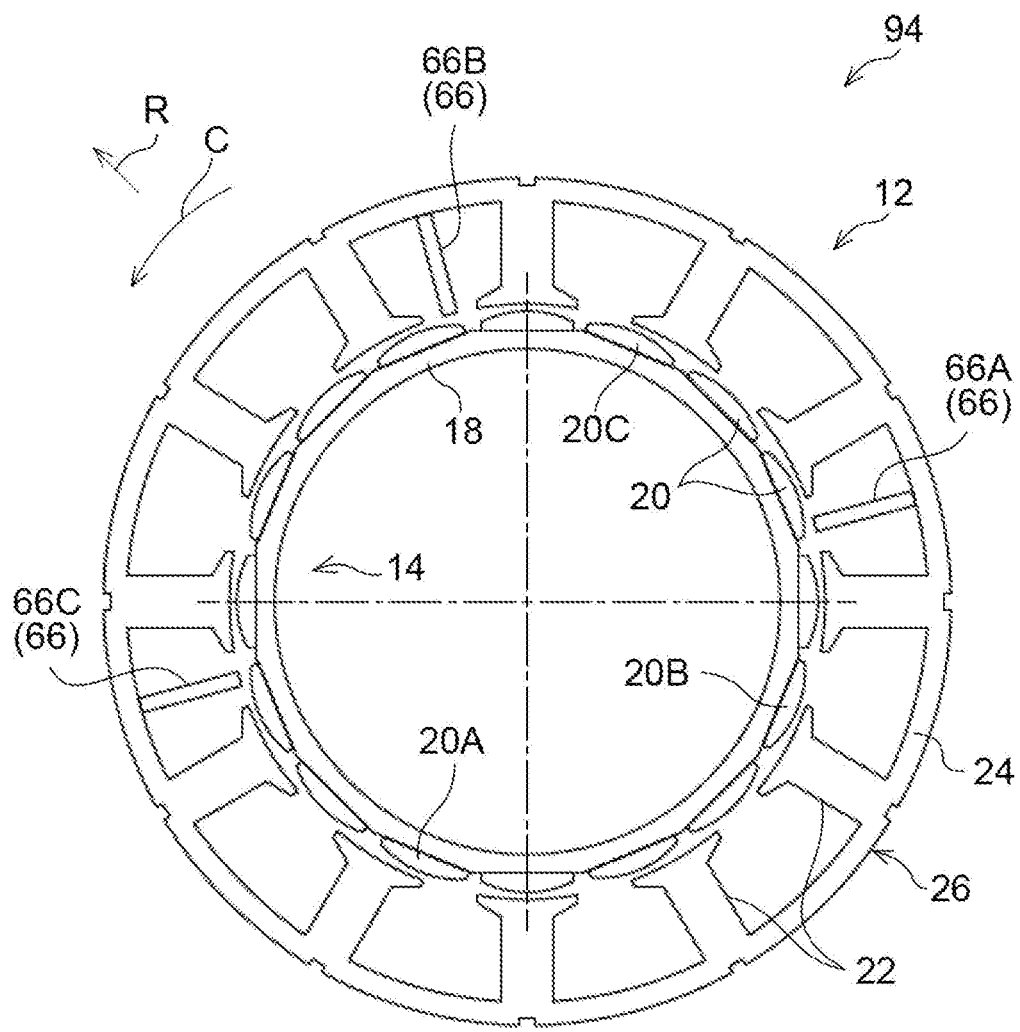
FIG. 30 is a plan view showing a stator and a rotor that constitute a motor according to a thirteenth embodiment.

As shown in FIG. 30, the motor 94 according to the thirteenth embodiment has a configuration that is a combination of the configuration of the motor 82 according to the seventh embodiment and the configuration of the motor 88 according to the tenth embodiment. That is, the motor 94 according to the thirteenth embodiment includes a first pseudo-tooth 66A, a second pseudo-tooth 66B and a third pseudo-tooth 66C. Moreover, in the motor 94 according to the thirteenth embodiment, of the sixteen magnets 20, three magnets 20A, 20B and 20C, which are arranged at intervals of 90° in mechanical angle in the circumferential direction, have the positions of magnetic-pole centers thereof offset to the one side in the circumferential direction with respect to the positions in the case of the sixteen magnets 20 being arranged at equal intervals in the circumferential direction.

In the thirteenth embodiment described above, it becomes possible to further increase the cogging torque of the motor 94 in comparison with both the motor 82 according to the seventh embodiment and the motor 88 according to the tenth embodiment.

Fourteenth Embodiment and Fifteenth Embodiment

Next, a motor 96 according to the fourteenth embodiment and a motor 98 according to the fifteenth embodiment will be described with reference to FIGS. 31 and 32. It should be noted that in the motors 96 and 98 according to the fourteenth and fifteenth embodiments, members and portions corresponding to those in the motor 74 according to the third embodiment are designated by the same reference numerals as the corresponding members and portions in the motor 74 and explanation thereof will be omitted hereinafter.

Figure 31:
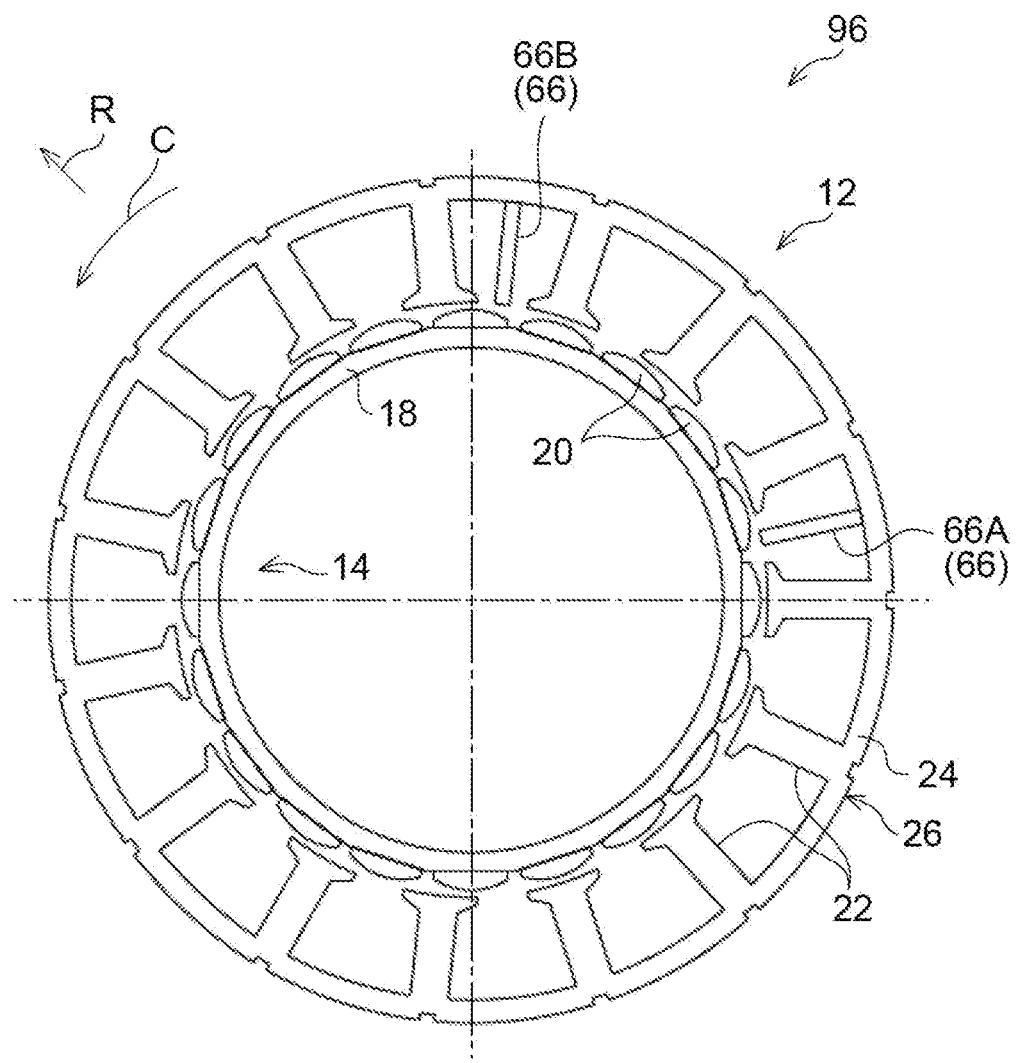
FIG. 31 is a plan view showing a stator and a rotor that constitute a motor according to a fourteenth embodiment.
Figure 32:
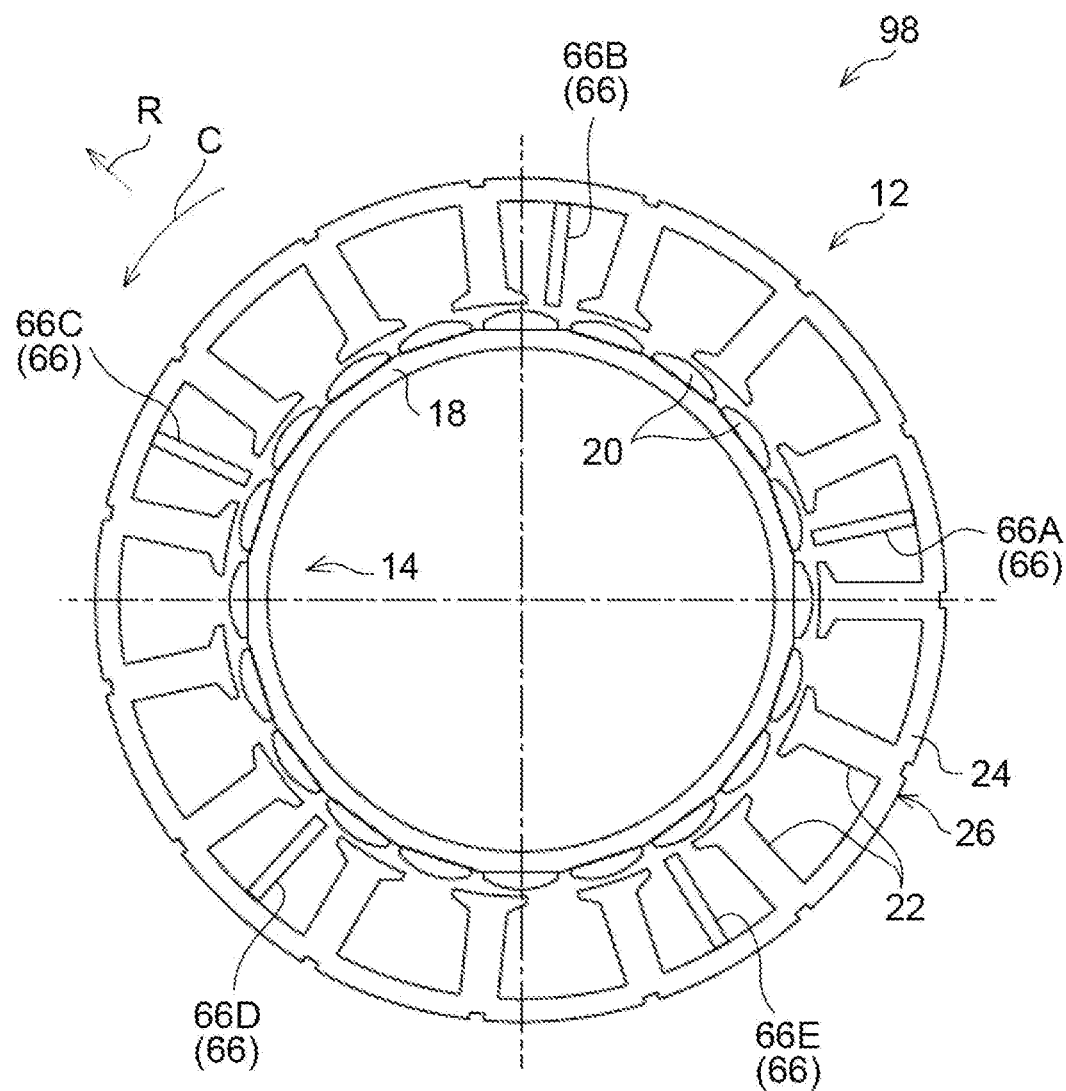
FIG. 32 is a plan view showing a stator and a rotor that constitute a motor according to a fifteenth embodiment.

As shown in FIGS. 31 and 32, the motor 96 according to the fourteenth embodiment and the motor 98 according to the fifteenth embodiment are 3-phase, 20-pole and 15-slot motors which are 4-pole 3-slot series motors.

As shown in FIG. 31, in the motor 96 according to the fourteenth embodiment, there are provided two pseudo-teeth 66A and 66B each of which is located in a circumferentially central area between a circumferentially-adjacent pair of the teeth 22. Moreover, the circumferential interval between the first pseudo-tooth 66A and the second pseudo-tooth 66B is set to 72°.

As shown in FIG. 32, in the motor 98 according to the fifteenth embodiment, there are provided five pseudo-teeth 66A, 66B, 66C, 66D and 66E each of which is located in a circumferentially central area between a circumferentially-adjacent pair of the teeth 22. Moreover, the circumferential interval between the first pseudo-tooth 66A and the second pseudo-tooth 66B, the circumferential interval between the second pseudo-tooth 66B and the third pseudo-tooth 66C, the circumferential interval between the third pseudo-tooth 66C and the fourth pseudo-tooth 66D and the circumferential interval between the fourth pseudo-tooth 66D and the fifth pseudo-tooth 66E are each set to 72°.

In the fourteenth and fifteenth embodiments described above, it becomes possible to increase the cogging torques of the motors 96 and 98 in comparison with the case of providing no pseudo-tooth 66 therein.

Sixteenth Embodiment, Seventeenth Embodiment and Eighteenth Embodiment

Next, a motor 100 according to the sixteenth embodiment, a motor 102 according to the seventeenth embodiment and a motor 104 according to the eighteenth embodiment will be described with reference to FIGS. 33-35. It should be noted that in the motors 100, 102 and 104 according to the sixteenth, seventeenth and eighteenth embodiments, members and portions corresponding to those in the motor 76 according to the fourth embodiment are designated by the same reference numerals as the corresponding members and portions in the motor 76 and explanation thereof will be omitted hereinafter.

Figure 33:
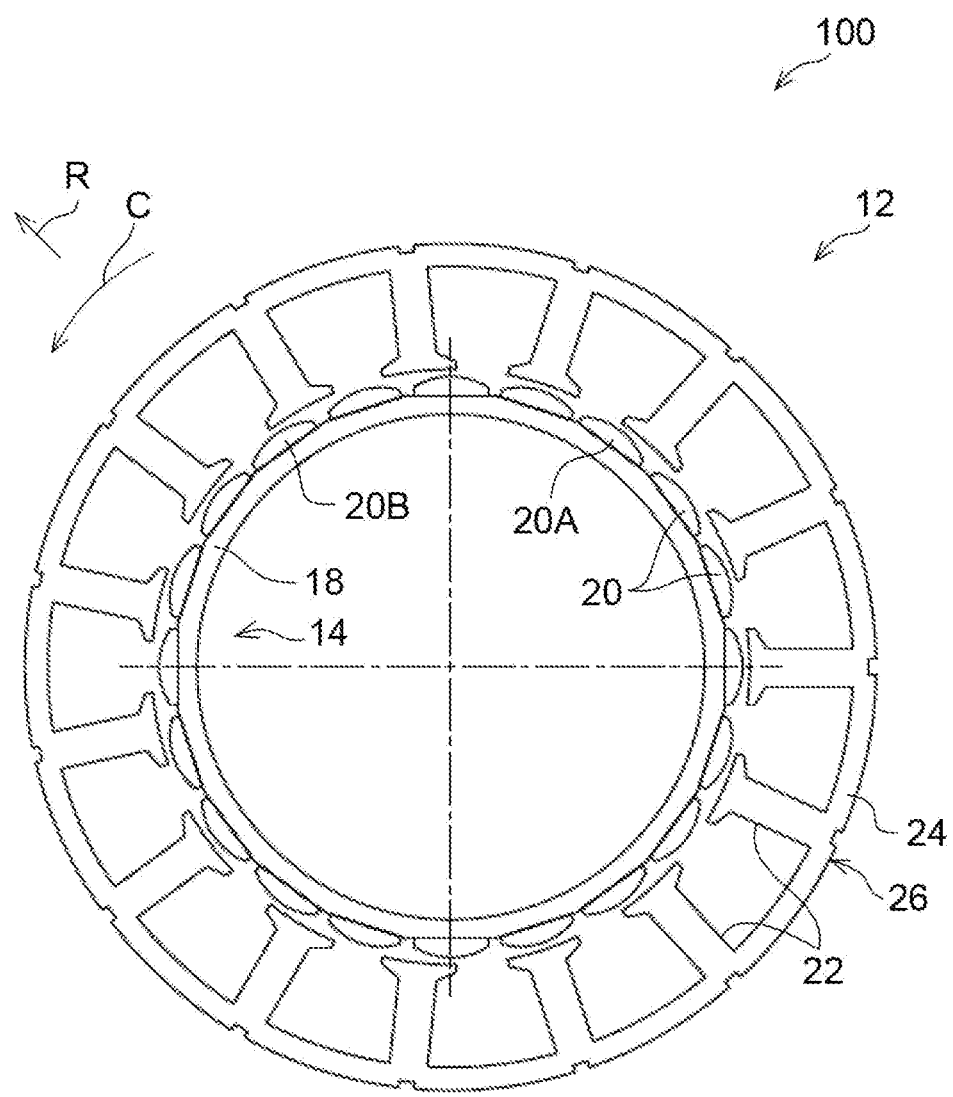
FIG. 33 is a plan view showing a stator and a rotor that constitute a motor according to a sixteenth embodiment.

As shown in FIG. 33, the motor 100 according to the sixteenth embodiment is a 3-phase, 20-pole and 15-slot motor which is a 4-pole 3-slot series motor. The motor 100 includes no pseudo-tooth 66, similar to the motor 76 according to the fourth embodiment. On the other hand, in the motor 100 according to the sixteenth embodiment, of the twenty magnets 20, two magnets 20A and 20B, which are arranged at positions where the electrical angle is 720° (360°×integer multiple), have the positions of magnetic-pole centers thereof offset to the one side in the circumferential direction with respect to the positions where the electrical angle is 720° (360°×integer multiple). More specifically, of the twenty magnets 20, the two magnets 20A and 20B, which are arranged at an interval of 72° in mechanical angle in the circumferential direction, have the positions of the magnetic-pole centers thereof offset, by the same distance (or circumferential angle), to the one side in the circumferential direction with respect to the positions in the case of the twenty magnets 20 being arranged at equal intervals in the circumferential direction.

In the sixteenth embodiment described above, of the twenty magnets 20, the two magnets 20A and 20B have the positions of the magnetic-pole centers thereof offset as described above. Consequently, it becomes possible to increase the cogging torque of the motor 100 in comparison with the case of the twenty magnets 20 being arranged at equal intervals in the circumferential direction.

Figure 34:
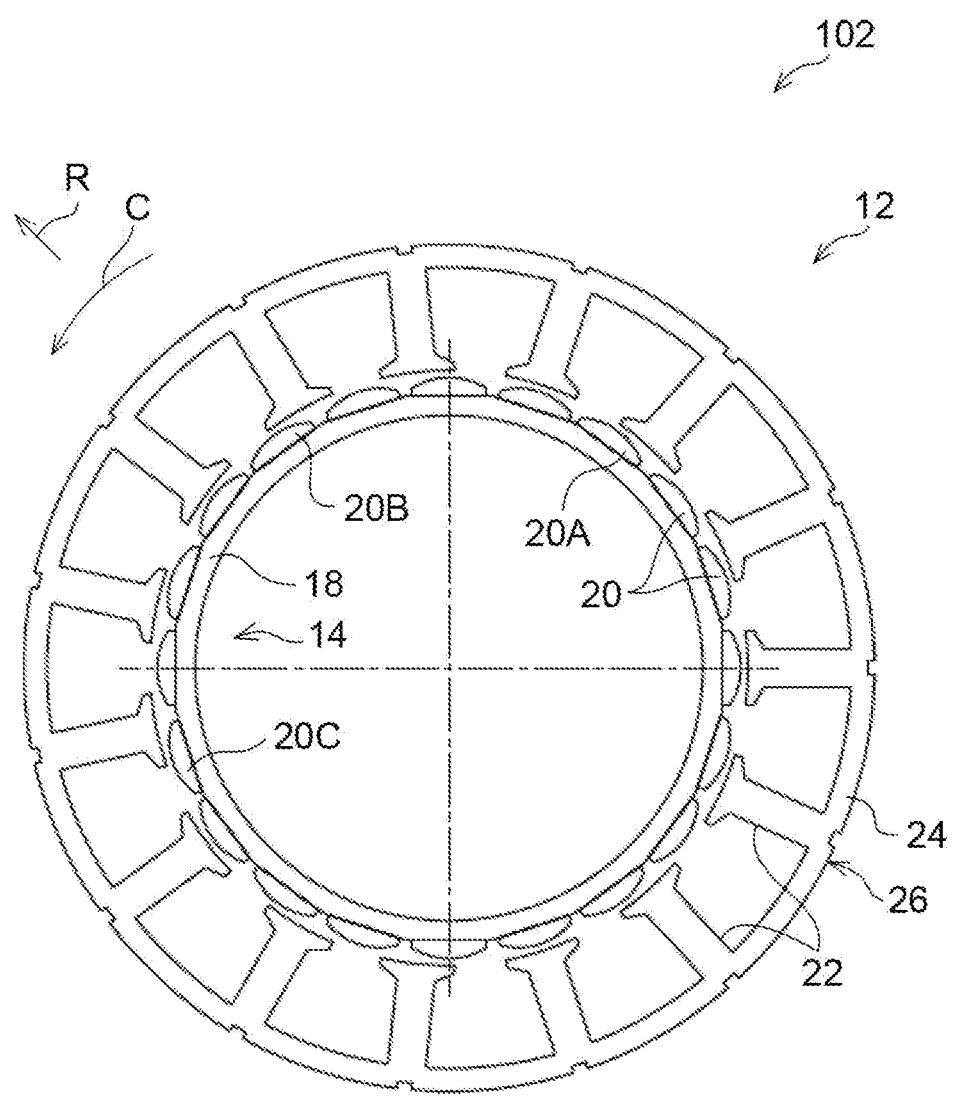
FIG. 34 is a plan view showing a stator and a rotor that constitute a motor according to a seventeenth embodiment.

As shown in FIG. 34, in the motor 102 according to the seventeenth embodiment, of the twenty magnets 20, three magnets 20A, 20B and 20C, which are arranged at positions where the electrical angle is 720° (360°×integer multiple), have the positions of magnetic-pole centers thereof offset to the one side in the circumferential direction with respect to the positions where the electrical angle is 720° (360°×integer multiple). More specifically, of the twenty magnets 20, the three magnets 20A, 20B and 20C, which are arranged at intervals of 72° in mechanical angle in the circumferential direction, have the positions of the magnetic-pole centers thereof offset, by the same distance (or circumferential angle), to the one side in the circumferential direction with respect to the positions in the case of the twenty magnets 20 being arranged at equal intervals in the circumferential direction.

In the seventeenth embodiment described above, it becomes possible to further increase the cogging torque of the motor 102 in comparison with the motor 100 according to the sixteenth embodiment.

Figure 35:
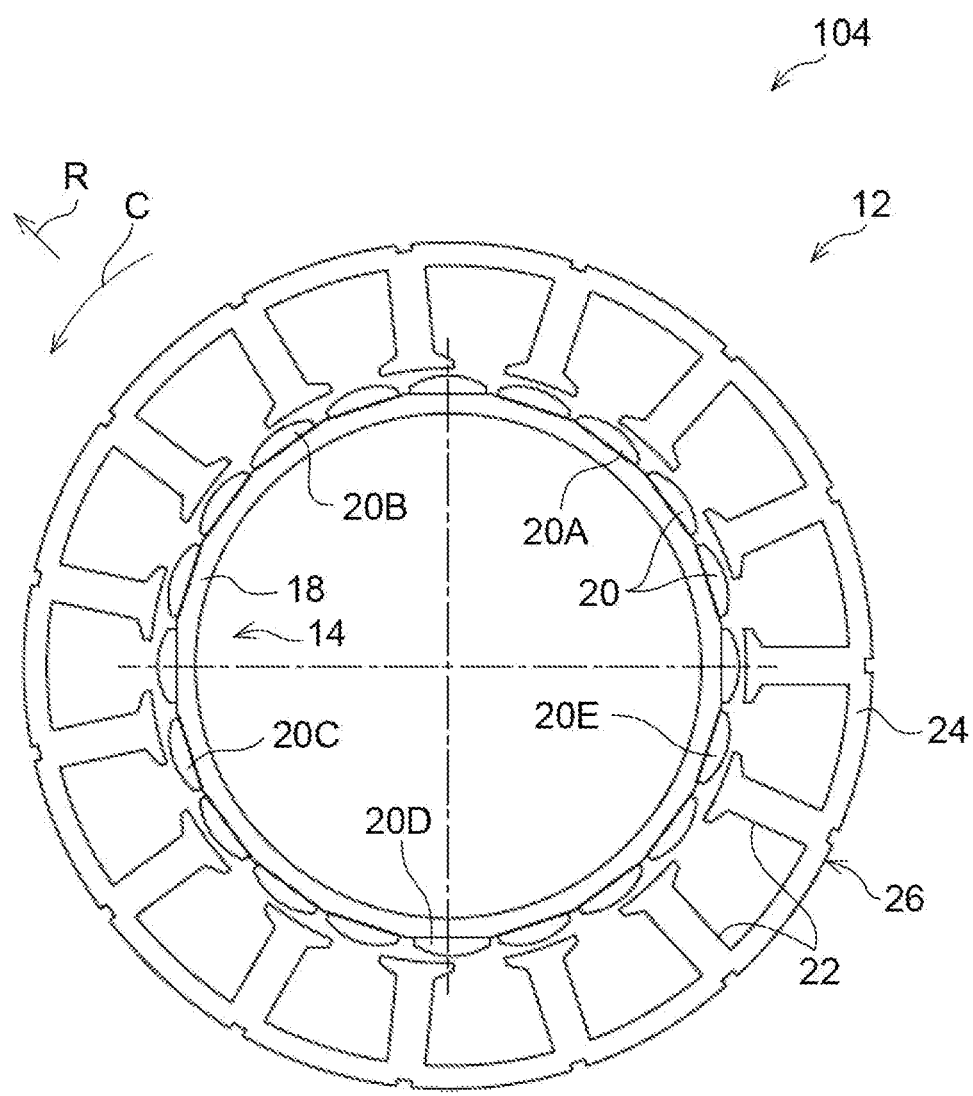
FIG. 35 is a plan view showing a stator and a rotor that constitute a motor according to an eighteenth embodiment.

As shown in FIG. 35, in the motor 104 according to the eighteenth embodiment, of the twenty magnets 20, five magnets 20A, 20B, 20C, 20D and 20E, which are arranged at positions where the electrical angle is 720° (360°×integer multiple), have the positions of magnetic-pole centers thereof offset to the one side in the circumferential direction with respect to the positions where the electrical angle is 720° (360°×integer multiple). More specifically, of the twenty magnets 20, the five magnets 20A, 20B, 20C, 20D and 20E, which are arranged at intervals of 72° in mechanical angle in the circumferential direction, have the positions of the magnetic-pole centers thereof offset, by the same distance (or circumferential angle), to the one side in the circumferential direction with respect to the positions in the case of the twenty magnets 20 being arranged at equal intervals in the circumferential direction.

In the eighteenth embodiment described above, it becomes possible to further increase the cogging torque of the motor 104 in comparison with in the motor 102 according to the seventeenth embodiment.

Nineteenth Embodiment, Twentieth Embodiment and Twenty-First Embodiment

Next, a motor 106 according to the nineteenth embodiment, a motor 108 according to the twentieth embodiment and a motor 110 according to the twenty-first embodiment will be described with reference to FIGS. 36-38. It should be noted that in the motors 106, 108 and 110 according to the nineteenth, twentieth and twenty-first embodiments, members and portions corresponding to those in the motors 74, 98, 102 and 104 according to the third, fifteenth, seventeenth and eighteenth embodiments are designated by the same reference numerals as the corresponding members and portions in the motors 74, 98, 102 and 104 and explanation thereof will be omitted hereinafter.

Figure 36:
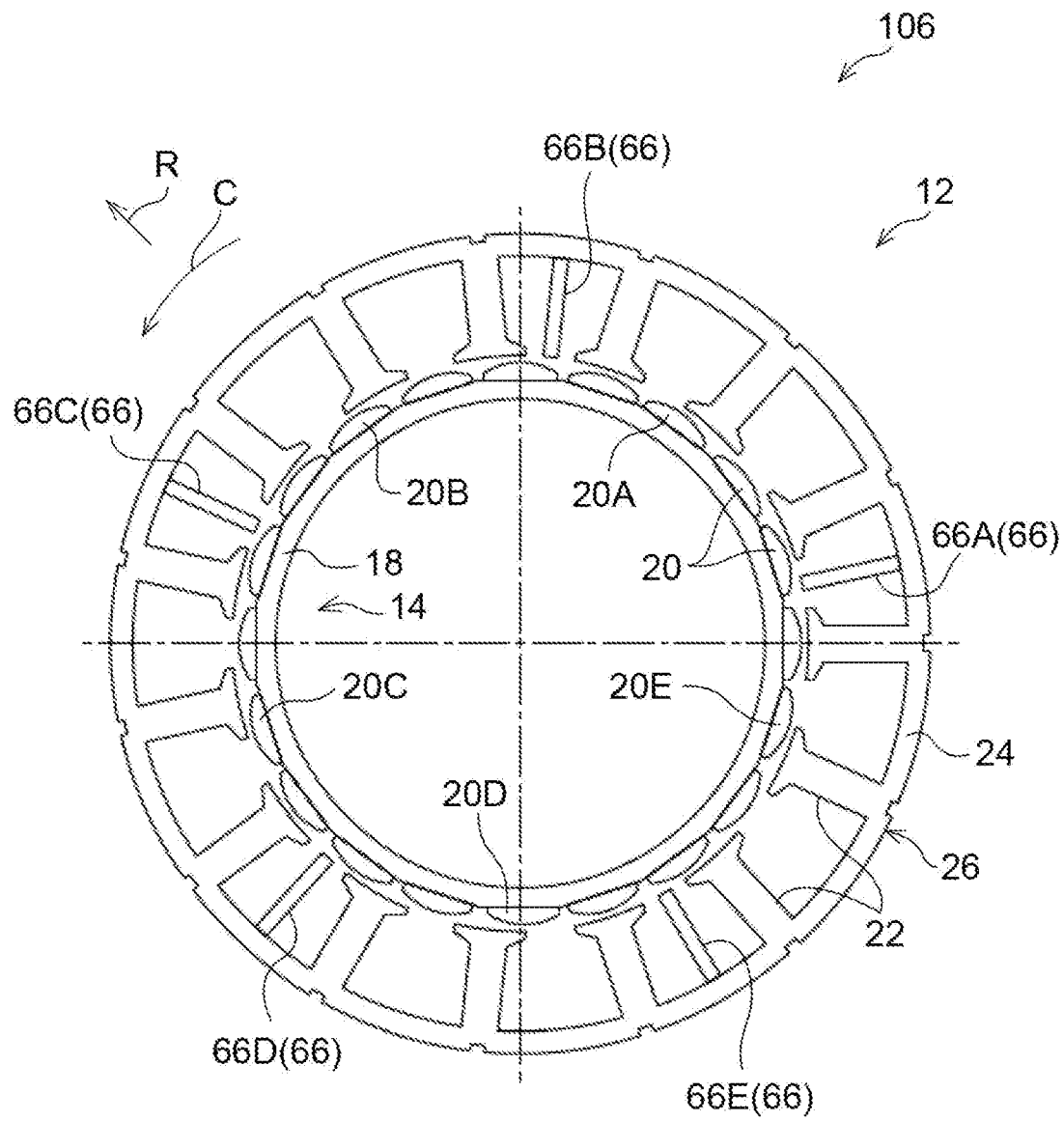
FIG. 36 is a plan view showing a stator and a rotor that constitute a motor according to a nineteenth embodiment.

As shown in FIG. 36, the motor 106 according to the nineteenth embodiment has a configuration that is a combination of the configuration of the motor 98 according to the fifteenth embodiment and the configuration of the motor 104 according to the eighteenth embodiment. That is, the motor 106 according to the nineteenth embodiment includes a first pseudo-tooth 66A, a second pseudo-tooth 66B, a third pseudo-tooth 66C, a fourth pseudo-tooth 66D and a fifth pseudo-tooth 66E. Moreover, in the motor 106 according to the nineteenth embodiment, of the twenty magnets 20, five magnets 20A, 20B, 20C, 20D and 20E, which are arranged at intervals of 72° in mechanical angle in the circumferential direction, have the positions of magnetic-pole centers thereof offset to the one side in the circumferential direction with respect to the positions in the case of the twenty magnets 20 being arranged at equal intervals in the circumferential direction.

In the nineteenth embodiment described above, it becomes possible to further increase the cogging torque of the motor 106 in comparison with both the motor 98 according to the fifteenth embodiment and the motor 104 according to the eighteenth embodiment.

Figure 37:
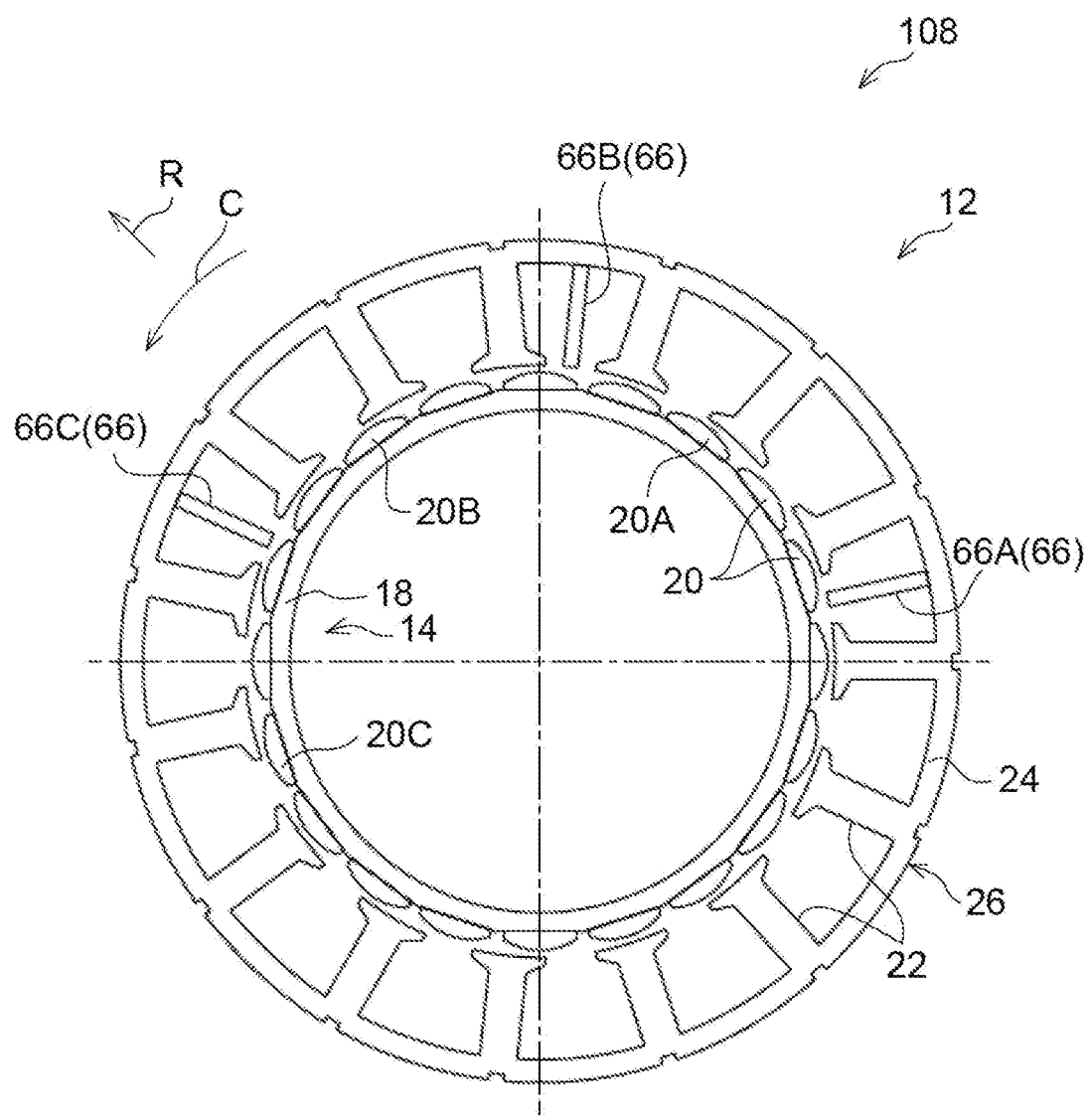
FIG. 37 is a plan view showing a stator and a rotor that constitute a motor according to a twentieth embodiment.

As shown in FIG. 37, the motor 108 according to the twentieth embodiment has a configuration that is a combination of the configuration of the motor 74 according to third embodiment and the configuration of the motor 102 according to the seventeenth embodiment. That is, the motor 108 according to the twentieth embodiment includes a first pseudo-tooth 66A, a second pseudo-tooth 66B and a third pseudo-tooth 66C. Moreover, in the motor 108 according to the twentieth embodiment, of the twenty magnets 20, three magnets 20A, 20B and 20C, which are arranged at intervals of 72° in mechanical angle in the circumferential direction, have the positions of magnetic-pole centers thereof offset to the one side in the circumferential direction with respect to the positions in the case of the twenty magnets 20 being arranged at equal intervals in the circumferential direction.

In the twentieth embodiment described above, it becomes possible to further increase the cogging torque of the motor 108 in comparison with both the motor 74 according to the third embodiment and the motor 102 according to the seventeenth embodiment.

Figure 38:
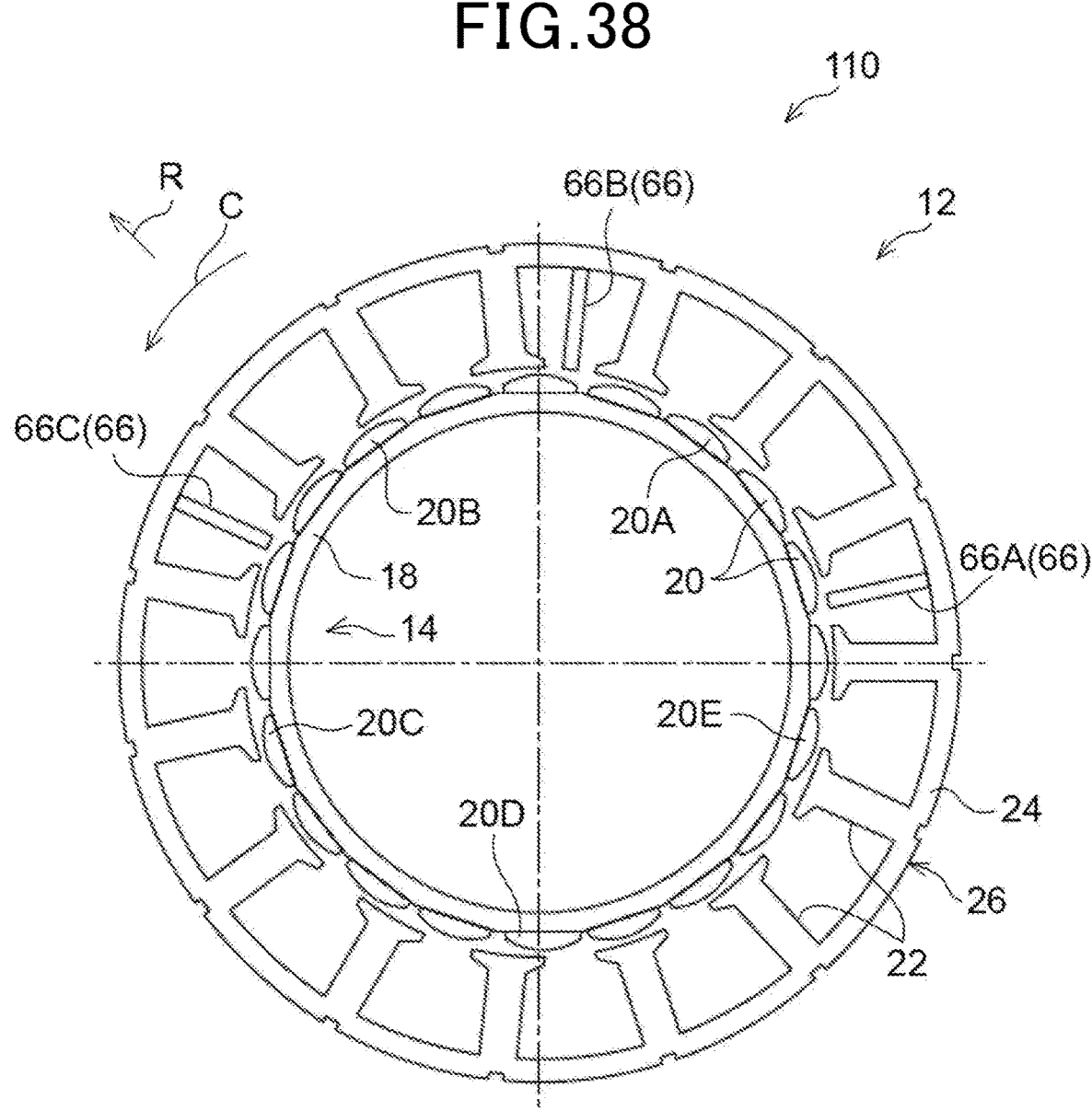
FIG. 38 is a plan view showing a stator and a rotor that constitute a motor according to a twenty-first embodiment.

As shown in FIG. 38, the motor 110 according to the twenty-first embodiment has a configuration that is a combination of the configuration of the motor 74 according to the third embodiment and the configuration of the motor 104 according to the eighteenth embodiment. That is, the motor 110 according to the twenty-first embodiment includes a first pseudo-tooth 66A, a second pseudo-tooth 66B and a third pseudo-tooth 66C. Moreover, in the motor 110 according to the twenty-first embodiment, of the twenty magnets 20, five magnets 20A, 20B, 20C, 20D and 20E, which are arranged at intervals of 72° in mechanical angle in the circumferential direction, have the positions of magnetic-pole centers thereof offset to the one side in the circumferential direction with respect to the positions in the case of the twenty magnets 20 being arranged at equal intervals in the circumferential direction.

In the twenty-first embodiment described above, it becomes possible to further increase the cogging torque of the motor 110 in comparison with both the motor 74 according to the third embodiment and the motor 104 according to the eighteenth embodiment.

Twenty-Second Embodiment

Next, a motor 112 according to the twenty-second embodiment will be described with reference to FIGS. 39 and 40. It should be noted that in motor 112 according to the twenty-second embodiment, members and portions corresponding to those in the motors 10 and 74 according to the first and third embodiments are designated by the same reference numerals as the corresponding members and portions in the motors 10 and 74 and explanation thereof will be omitted hereinafter.

Figure 39:
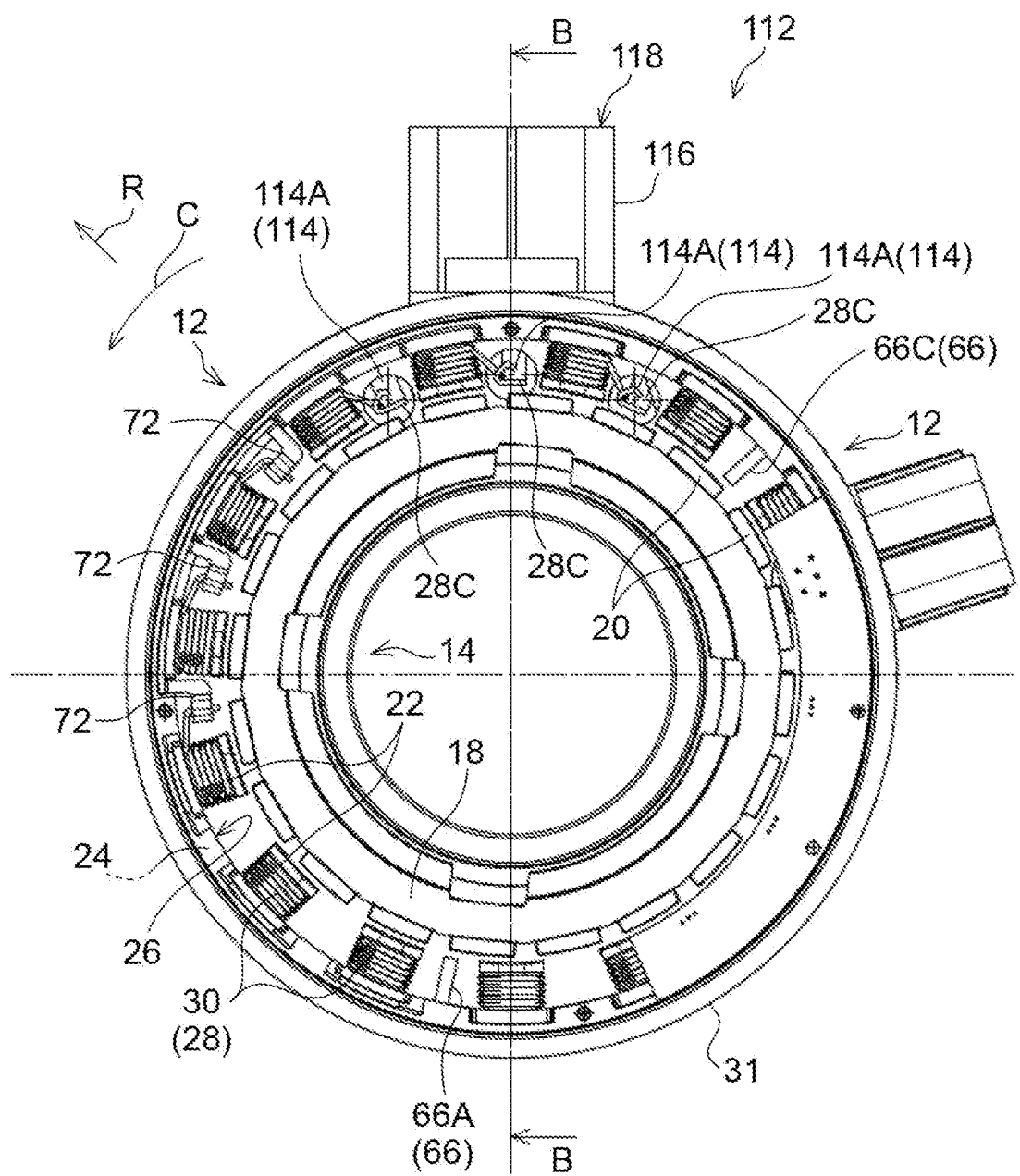
FIG. 39 is a plan view showing a stator and a rotor that constitute a motor according to a twenty-second embodiment.
Figure 40:
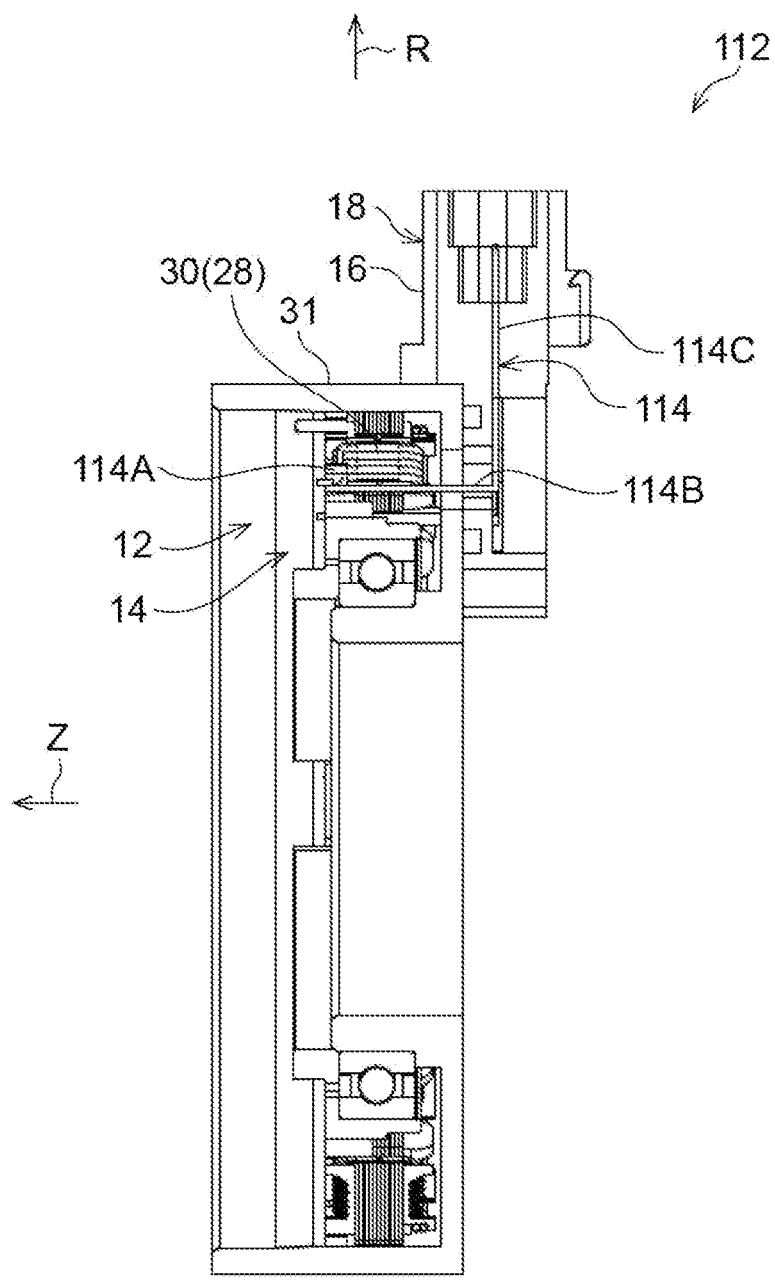
FIG. 40 is a cross-sectional view showing a cross section of the stator, the rotor and the like along the line B-B shown in FIG. 39.

As shown in FIGS. 39 and 40, the motor 112 according to the present embodiment has a configuration that is a combination of the configuration of the stator core 26 of the motor 74 according to the third embodiment and part of the configuration of the motor 10 according to the first embodiment. Moreover, the motor 112 according to the present embodiment further includes a direct connector 118 that includes three direct terminals 114 each having a connection portion 114A and a connector body 116 holding the three direct terminals 114. To the connection portions 114A of the direct terminals 114, there are respectively connected a distal end portion 28C of the winding 28 forming the U-phase coils 30, a distal end portion 28C of the winding 28 forming the V-phase coils 30 and a distal end portion 28C of the winding 28 forming the W-phase coils 30.

Each of the direct terminals 114 has the connection portion 114A to which the distal end portion 28C of the corresponding winding 28 is connected, a first extending portion 114B that extends from the connection portion 114A toward the other side in the axial direction, and a second extending portion 114C that is bent and extends radially outward from an end portion of the first extending portion 114B on the other side in the axial direction. The connection portions 114A of the three direct terminals 114 and parts of the first extending portions 114B of the three direct terminals 114 on the one side in the axial direction are arranged so as to be concentrated in a part of the stator core 26 in the circumferential direction. Moreover, for each of the three direct terminals 114, the connection portion 114A of the direct terminal 114 and the part of the first extending portion 114B of the direct terminal 114 on the one side in the axial direction are located between a circumferentially-adjacent pair of the teeth 22. On the other hand, parts of the first extending portions 114B of the three direct terminals 114 on the other side in the axial direction and the second extending portions 114C of the three direct terminals 114 are located on the other side in the axial direction with respect to the stator 12 and held by the connector body 116. The connector body 116 is constituted of an electrically-insulative member and fixed to a housing 31 that holds the stator 12.

In the present embodiment described above, the connection portions 114A of the three direct terminals 114 and parts of the first extending portions 114B of the three direct terminals 114 on the one side in the axial direction are arranged so as to be concentrated in a part of the stator core 26 in the circumferential direction. Moreover, for each of the three direct terminals 114, the connection portion 114A of the direct terminal 114 and the part of the first extending portion 114B of the direct terminal 114 on the one side in the axial direction are located between a circumferentially-adjacent pair of the teeth 22. With the above arrangement, it becomes possible to suppress increase in size of the direct connector 118.

In the above-described embodiments, 4-pole 3-slot series motors have been described. However, the present disclosure is not limited to these motors. It should be noted that 4-pole 3-slot series motors denote motors which have 4×n poles and 3×n slots (n=1, 2, 3 . . . ). By applying the configurations of main parts of the present disclosure to 4-pole 3-slot series motors and 10-pole 6-slot series motors, it is possible to achieve both high torque and high cogging torque of the motors. Moreover, by applying the configurations of main parts of the present disclosure to 2-pole 3-slot series motors and 10-pole 12-slot series motors, it is possible to achieve high cogging torque of the motors.

Furthermore, the above-described configurations of the present disclosure can also be applied to motors where magnets 20 of a rotor 16 are arranged radially outside a stator core 26.

While the above particular embodiments of the present disclosure have been shown and described, it will be understood by those skilled in the art that the present disclosure is not limited to the above particular embodiments, but may be carried out through various modifications without departing from the spirit of the present disclosure.

Moreover, while the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:
1. A motor comprising:
a stator including a stator core and coils, the stator core being formed of a magnetic material and having a plurality of teeth arranged at intervals in a circumferential direction, the coils being formed of electrically-conductive windings wound around the teeth;
a rotor having a plurality of magnets arranged in radial opposition to the stator core and at intervals in the circumferential direction, the rotor being configured to rotate upon supply of electric current to the coils;
a plurality of pseudo-teeth formed of a magnetic material and each located in a circumferentially intermediate area between a circumferentially-adjacent pair of the teeth, the pseudo-teeth being arranged so as to be concentrated in a part of the stator core in the circumferential direction; and
a plurality of sensors each of which is located in a circumferentially intermediate area between a circumferentially-adjacent pair of the teeth, the sensors being arranged so as to be concentrated in a part of the stator core in the circumferential direction, the part of the stator core where the sensors are concentrated being different from the part of the stator core where the pseudo-teeth are arranged, wherein a sum of a total number of the pseudo-teeth and a total number of the sensors is set to be smaller than a total number of the teeth.

2. The motor as set forth in claim 1, further comprising a plurality of terminals each of which is located in a circumferentially intermediate area between a circumferentially-adjacent pair of the teeth, the terminals being arranged so as to be concentrated in a part of the stator core in the circumferential direction, the part of the stator core where the terminals are concentrated being different from both the part of the stator core where the pseudo-teeth are arranged and the part of the stator core where the sensors are arranged.

3. The motor as set forth in claim 2, wherein the plurality of terminals comprise circuit-board connection terminals, the circuit-board connection terminals are arranged in the circumferential direction of the stator core on the side where the sensors are arranged, a circuit board is arranged on one side in an axial direction of the stator core, and the circuit-board connection terminals and the sensors are connected with the circuit board.

4. The motor as set forth in claim 3, wherein the plurality of terminals comprise, in addition to the circuit-board connection terminals, neutral-point terminals that connect between the windings, and a sum of the total number of the pseudo-teeth, the total number of the sensors, a total number of the circuit-board connection terminals and a total number of the neutral-point terminals is set to be equal to the total number of the teeth.

5. The motor as set forth in claim 2, wherein an insulator, which is formed of an electrically-insulative material, is mounted to the stator core, and to the insulator, there is mounted a busbar by which the sensors and the terminals are supported.

* * * * *